United States Patent
Chang et al.

(10) Patent No.: US 12,515,423 B2
(45) Date of Patent: Jan. 6, 2026

(54) CONTACT LENS WITH A HYDROGEL COATING THEREON

(71) Applicant: Alcon Inc., Fribourg (CH)

(72) Inventors: Frank Chang, Cumming, GA (US); Troy Vernon Holland, Suwanee, GA (US); Thomas M. Moy, Cumming, GA (US)

(73) Assignee: Alcon Inc., Fribourg (CH)

( * ) Notice: Subject to any disclaimer, the term of this patent is extended or adjusted under 35 U.S.C. 154(b) by 161 days.

(21) Appl. No.: 18/450,451

(22) Filed: Aug. 16, 2023

(65) Prior Publication Data
US 2024/0092043 A1 Mar. 21, 2024

Related U.S. Application Data

(60) Provisional application No. 63/371,660, filed on Aug. 17, 2022.

(51) Int. Cl.
*B29D 11/00* (2006.01)
*C08F 20/06* (2006.01)
(Continued)

(52) U.S. Cl.
CPC ........ *B29D 11/00134* (2013.01); *C08F 20/06* (2013.01); *C08F 30/02* (2013.01); *C08J 7/056* (2020.01); *G02B 1/043* (2013.01)

(58) Field of Classification Search
CPC .... B29D 11/00134; C08J 7/056; C08F 20/06; C08F 30/02; G02B 1/043
See application file for complete search history.

(56) References Cited

U.S. PATENT DOCUMENTS

| | | |
|---|---|---|
| 3,299,173 A | 1/1967 | Roselli |
| 3,408,429 A | 10/1968 | Wichterle |
| (Continued) | | |

FOREIGN PATENT DOCUMENTS

| | | |
|---|---|---|
| EP | 0632329 A1 | 1/1995 |
| JP | 2001-075060 A | 3/2001 |

OTHER PUBLICATIONS

Chung-Peng Ho and H. Yasuda; Ultrathin Coating of Plasma Polymer of Methane Applied on the Surface of Silicone Contact Lenses; Journal of Biomedical Materials Research, vol. 22, pp. 919-937 (1988).
(Continued)

*Primary Examiner* — Mathieu D Vargot
(74) *Attorney, Agent, or Firm* — Jian Zhou

(57) ABSTRACT

The invention is related to a cost-effective method for making a coated contact lens having a hydrogel coating thereon. A method of the invention involves heating a contact lens precursor having carboxylic acid groups on and/or near its surface in an aqueous solution in the presence of a hydrophilic copolymer that comprises monomeric units of (a) at least one epoxy-containing vinylic monomer, (b) at least one amino-containing vinylic monomer having a primary or secondary amino group, (c) at least one polyethyleneglycol-containing vinylic monomer, and (d) at least one phosphorylcholine-containing vinylic monomer, at a temperature from about 100° C. to about 140° C. for at least 30 minutes, thereby forming a hydrogel coating on the contact lens precursor. Such a method can be advantageously implemented directly in a sealed lens package during autoclave.

20 Claims, 1 Drawing Sheet

(51) Int. Cl.
*C08F 30/02* (2006.01)
*C08J 7/056* (2020.01)
*G02B 1/04* (2006.01)

(56) References Cited

U.S. PATENT DOCUMENTS

| | | |
|---|---|---|
| 4,042,552 A | 8/1977 | Grucza |
| 4,045,547 A | 8/1977 | Le Boeuf et al. |
| 4,136,250 A | 1/1979 | Mueller et al. |
| 4,143,949 A | 3/1979 | Chen |
| 4,153,641 A | 5/1979 | Deichert et al. |
| 4,182,822 A | 1/1980 | Chang |
| 4,189,546 A | 2/1980 | Deichert et al. |
| 4,254,248 A | 3/1981 | Friends et al. |
| 4,259,467 A | 3/1981 | Keogh et al. |
| 4,260,725 A | 4/1981 | Keogh et al. |
| 4,261,875 A | 4/1981 | LeBoeuf |
| 4,276,402 A | 6/1981 | Chromecek |
| 4,312,575 A | 1/1982 | Peyman et al. |
| 4,327,203 A | 4/1982 | Deichert et al. |
| 4,341,889 A | 7/1982 | Deichert et al. |
| 4,343,927 A | 8/1982 | Chang |
| 4,347,198 A | 8/1982 | Ohkada et al. |
| 4,355,147 A | 10/1982 | Deichert et al. |
| 4,444,711 A | 4/1984 | Schad |
| 4,460,534 A | 7/1984 | Boehm et al. |
| 4,486,577 A | 12/1984 | Mueller et al. |
| 4,528,311 A | 7/1985 | Beard |
| 4,543,398 A | 9/1985 | Bany et al. |
| 4,605,712 A | 8/1986 | Mueller et al. |
| 4,612,358 A | 9/1986 | Besecke |
| 4,661,575 A | 4/1987 | Tom |
| 4,684,538 A | 8/1987 | Klemarczyk |
| 4,703,097 A | 10/1987 | Wingler et al. |
| 4,716,234 A | 12/1987 | Dunks |
| 4,833,218 A | 5/1989 | Lee |
| 4,837,289 A | 6/1989 | Mueller et al. |
| 4,954,586 A | 9/1990 | Toyoshim et al. |
| 4,954,587 A | 9/1990 | Mueller |
| 5,010,141 A | 4/1991 | Mueller |
| 5,034,461 A | 7/1991 | Lai et al. |
| 5,039,761 A | 8/1991 | Ono et al. |
| 5,070,170 A | 12/1991 | Robertson et al. |
| 5,070,215 A | 12/1991 | Bambury et al. |
| 5,079,319 A | 1/1992 | Mueller |
| 5,198,477 A | 3/1993 | von der Haegen et al. |
| 5,219,965 A | 6/1993 | Valint, Jr. |
| 5,346,946 A | 9/1994 | Yokoyama et al. |
| 5,358,995 A | 10/1994 | Lai et al. |
| 5,387,632 A | 2/1995 | Lai et al. |
| 5,416,132 A | 5/1995 | Yokoyama et al. |
| 5,449,729 A | 9/1995 | Lai |
| 5,451,617 A | 9/1995 | Lai et al. |
| 5,464,667 A | 11/1995 | Koehler |
| 5,486,579 A | 1/1996 | Lai et al. |
| 5,508,317 A | 4/1996 | Müller |
| 5,527,925 A | 6/1996 | Chabrecek et al. |
| 5,583,163 A | 12/1996 | Müller |
| 5,583,463 A | 12/1996 | Merritt |
| 5,599,576 A | 2/1997 | Opolski |
| 5,760,100 A | 6/1998 | Nicolson et al. |
| 5,766,158 A | 6/1998 | Opolski |
| 5,789,464 A | 8/1998 | Müller |
| 5,843,346 A | 12/1998 | Morrill |
| 5,849,810 A | 12/1998 | Müller |
| 5,894,002 A | 4/1999 | Boneberger et al. |
| 5,962,548 A | 10/1999 | Vanderlaan et al. |
| 5,981,675 A | 11/1999 | Valint, Jr. et al. |
| 6,039,913 A | 3/2000 | Hirt et al. |
| 6,087,415 A | 7/2000 | Vanderlaan |
| 6,096,726 A | 8/2000 | Opolski |
| 6,099,122 A | 8/2000 | Chabrecek et al. |
| 6,166,236 A | 12/2000 | Bambury et al. |
| 6,303,687 B1 | 10/2001 | Müller |
| 6,340,465 B1 | 1/2002 | Hsu |
| 6,367,929 B1 | 4/2002 | Maiden et al. |
| 6,436,481 B1 | 8/2002 | Chabrecek et al. |
| 6,440,571 B1 | 8/2002 | Valint, Jr. et al. |
| 6,447,920 B1 | 9/2002 | Chabrecek et al. |
| 6,451,871 B1 | 9/2002 | Winterton et al. |
| 6,465,056 B1 | 10/2002 | Chabrecek et al. |
| 6,500,481 B1 | 12/2002 | Vanderlaan et al. |
| 6,521,352 B1 | 2/2003 | Chabrecek et al. |
| 6,534,559 B1 | 3/2003 | Vanderlaan |
| 6,586,038 B1 | 7/2003 | Chabrecek et al. |
| 6,623,747 B1 | 9/2003 | Chatelier et al. |
| 6,627,124 B1 | 9/2003 | Herbrechtsmeier et al. |
| 6,683,062 B2 | 1/2004 | Opolski |
| 6,719,929 B2 | 4/2004 | Winterton et al. |
| 6,730,366 B2 | 5/2004 | Lohmann et al. |
| 6,734,321 B2 | 5/2004 | Chabracek et al. |
| 6,762,264 B2 | 7/2004 | Kunzler et al. |
| 6,793,973 B2 | 9/2004 | Winterton et al. |
| 6,800,225 B1 | 10/2004 | Hagmann et al. |
| 6,811,805 B2 | 11/2004 | Gilliard et al. |
| 6,822,016 B2 | 11/2004 | McCabe et al. |
| 6,835,410 B2 | 12/2004 | Chabrecek et al. |
| 6,838,491 B1 | 1/2005 | Vanderlaan |
| 6,866,936 B2 | 3/2005 | Opolski |
| 6,867,245 B2 | 3/2005 | Iwata et al. |
| 6,878,399 B2 | 4/2005 | Chabrecek et al. |
| 6,881,269 B2 | 4/2005 | Matsuzawa |
| 6,896,926 B2 | 5/2005 | Qiu et al. |
| 6,923,978 B2 | 8/2005 | Chatelier et al. |
| 7,078,074 B2 | 7/2006 | Matsuzawa |
| 7,214,809 B2 | 5/2007 | Zanini et al. |
| 7,279,507 B2 | 10/2007 | Hu |
| 7,384,590 B2 | 6/2008 | Kelly et al. |
| 7,387,759 B2 | 6/2008 | Kelly et al. |
| 7,423,074 B2 | 9/2008 | Lai et al. |
| 7,605,190 B2 | 10/2009 | Moszner et al. |
| 7,858,000 B2 | 12/2010 | Winterton |
| 8,030,369 B2 | 10/2011 | Winterton |
| 8,044,112 B2 | 10/2011 | Matsuzawa |
| 8,147,897 B2 | 4/2012 | Ferreiro et al. |
| 8,158,192 B2 | 4/2012 | Bothe |
| 8,163,206 B2 | 4/2012 | Chang |
| 8,409,599 B2 | 4/2013 | Wu et al. |
| 8,415,405 B2 | 4/2013 | Maggio et al. |
| 8,475,529 B2 | 7/2013 | Clarke |
| 8,480,227 B2 | 7/2013 | Qiu et al. |
| 8,529,057 B2 | 9/2013 | Qiu et al. |
| 8,557,334 B2 | 10/2013 | Samuel et al. |
| 8,614,261 B2 | 12/2013 | Iwata et al. |
| 8,658,748 B2 | 2/2014 | Liu |
| 8,835,525 B2 | 9/2014 | Kuyu et al. |
| 8,993,651 B2 | 3/2015 | Chang et al. |
| 9,097,840 B2 | 8/2015 | Chang |
| 9,103,965 B2 | 8/2015 | Chang |
| 9,156,213 B2 | 10/2015 | Qiu |
| 9,187,601 B2 | 11/2015 | Huang |
| 9,217,813 B2 | 12/2015 | Liu et al. |
| 9,244,195 B2 | 1/2016 | Bauman |
| 9,315,669 B2 | 4/2016 | Holland |
| 9,475,827 B2 | 10/2016 | Chang |
| 9,505,184 B2 | 11/2016 | Kolluru |
| 9,804,295 B2 | 10/2017 | Winterton et al. |
| 10,081,697 B2 | 9/2018 | Huang |
| 10,155,349 B2 | 12/2018 | Pruitt et al. |
| 10,222,509 B2 | 3/2019 | Kolluru et al. |
| 10,254,567 B2 | 4/2019 | Chang |
| 10,301,451 B2 | 5/2019 | Jing |
| 10,465,047 B2 | 11/2019 | Jing |
| 11,061,168 B2 | 7/2021 | Kolluru et al. |
| 11,256,003 B2 | 2/2022 | Qiu et al. |
| 2007/0122540 A1 | 5/2007 | Salamone et al. |
| 2008/0142038 A1 | 6/2008 | Kunzler et al. |
| 2009/0145086 A1 | 6/2009 | Reynolds et al. |
| 2009/0145091 A1 | 6/2009 | Connolly et al. |
| 2012/0314185 A1 | 12/2012 | Bauman |
| 2020/0172756 A1 | 6/2020 | Qiu |

(56) References Cited

U.S. PATENT DOCUMENTS

2020/0339836 A1    10/2020  Qiu
2022/0032564 A1*  2/2022  Qiu ..................... C09D 133/08

OTHER PUBLICATIONS

D. Auciello et al. (ed.) "Plasma-Surface Interactions and Processing of Materials"; The Application of Plasmas to Thin Film Deposition Processes; Kluwer Academic Publishers, 1990, pp. 377-399.
H. Yasuda, "Glow Discharge Polymerization", Journal of Polymer Science: Macromolecular Reviews, vol. 16, pp. 199-293, 1981.
N. Dilsiz and G. Akovali: "Plasma Polymerization of Selected Organic Compounds", Polymer, vol. 37 (1996) pp. 333-341.
R. Hartmann, Plasma polymerisation: Grundlagen, Technik and Anwendung, Jahrbuch Oberflachentechnik Band, vol. 49, pp. 283-296, Battelle-Inst. e.V. Frankfurt/Main, Germany, 1993.

* cited by examiner

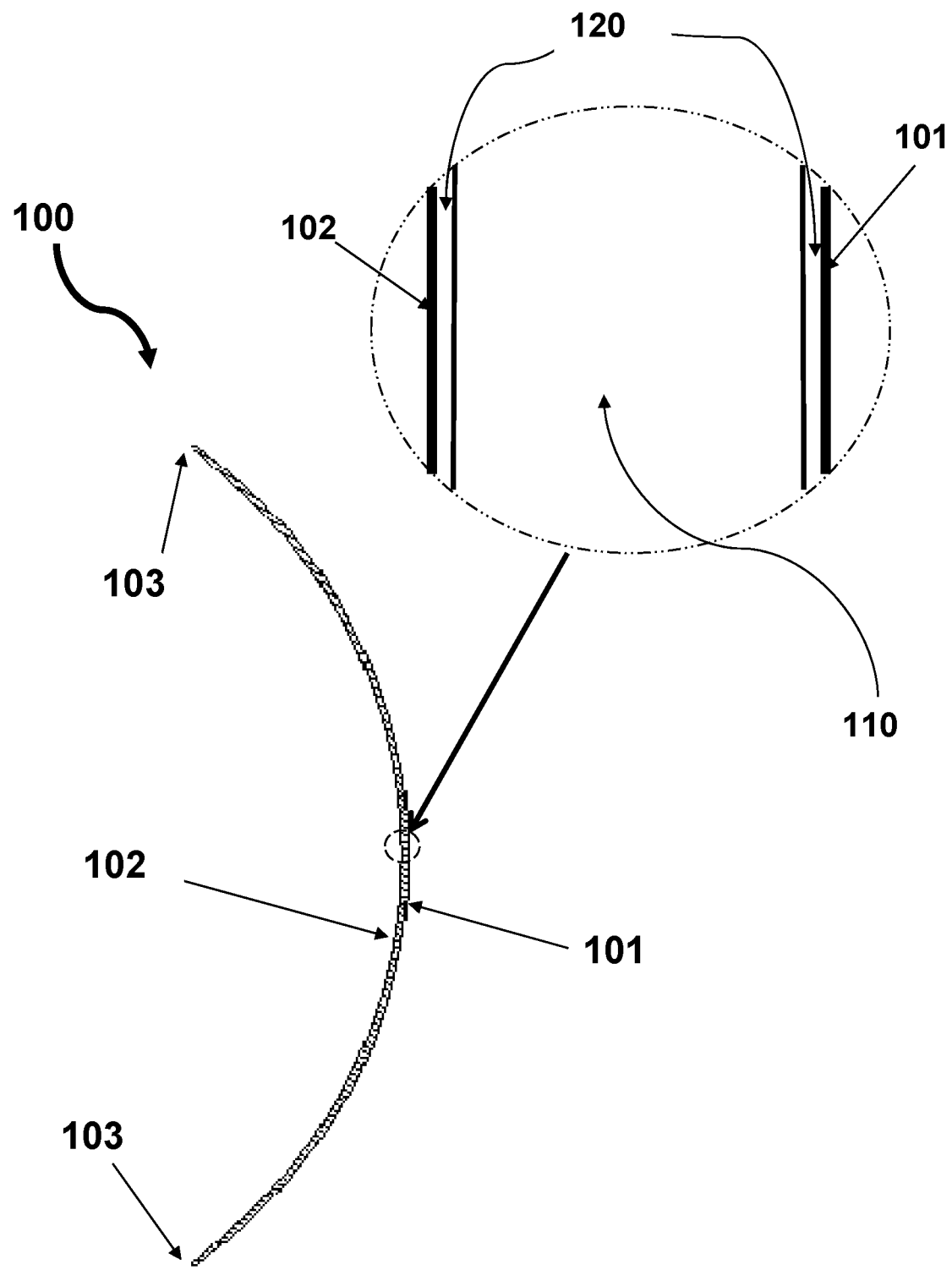

CONTACT LENS WITH A HYDROGEL COATING THEREON

This application claims the benefits under 35 USC § 119 (e) of U.S. provisional application No. 63/371,660, filed on 17 Aug. 2022, incorporated by reference in its entirety.

The present invention generally relates to a cost-effective and time-efficient method for applying a hydrogel coating onto a contact lens, especially a silicone hydrogel contact lens, to improve its hydrophilicity and lubricity. In addition, the present invention provides an ophthalmic lens product.

BACKGROUND

In recent years, a great number of efforts have been made to develop contact lenses with improved wearing comfort.

One example is to incorporate leacheable wetting agents in contact lenses (see, e.g., U.S. Pat. Nos. 4,045,547, 4,042,552, 5,198,477, 5,219,965, 6,367,929 6,822,016, 7,279,507, 8,030,369, and 9,804,295).

Another example is to incorporate bioactive agents and hydrophobic comfort agents into contact lenses (see, e.g., U.S. Pat. No. 10,155,349).

A further example is to make contact lenses having a nano-textured surface which mimics the surface texture of cornea of human eye (see, e.g., U.S. Pat. No. 9,244,195).

Also a further example is the development of a new class of soft contact lenses, water gradient contact lenses. This new class of soft contact lenses have been first developed and successfully introduced as daily-disposable contact lenses, DAILIES® TOTAL1® (Alcon), in the market. Weekly- or monthly-disposable water gradient soft contact lenses with a durable hydrogel coating and with a reduced uptake of positively-charged antimicrobial agents present in multipurpose lens care solutions have also be developed (U.S. Pat. No. 11,256,003) and introduced as monthly-replacement water gradient contact lenses, TOTAL300 (Alcon), in the market. This new class of soft contact lenses is characterized by having a water-gradient structural configuration, an increase in water content observed in passing from the core to the surface of the contact lens, reaching the highest water content in the region near and including the surface of the contact lens (see, U.S. Pat. No. 8,480,227). This unique design can deliver a highly-lubricious and remarkably-soft, water-rich lens surface that in turn provide superior wearing comfort to patients.

As described in U.S. Pat. Nos. 8,480,227 and 11,256,003, processes for making water gradient contact lenses often involve use of a partially-crosslinked and thermally-crosslikable hydrophilic polymeric material in the formation of non-silicone hydrogel coatings on contact lenses. Those processes may require an extra step for producing partially-crosslinked and thermally-crosslikable hydrophilic polymeric material. Thus, it would be desirable to eliminate such an extra step to simplify the manufacturing process for making water gradient contact lenses.

SUMMARY OF THE INVENTION

In one aspect, the invention provides a method for making coated contact lenses, comprising the steps of: (1) obtaining a contact lens precursor which has a concave surface and an opposite convex surface and comprises a lens bulk material and carboxylic acid groups on and/or near the anterior and posterior surfaces; (2) immersing the contact lens precursor in an aqueous solution in a container, wherein the aqueous solution comprises from about 0.01% to about 5.0% by weight of at least one hydrophilic copolymer that comprises (a) monomeric units of at least one epoxy-containing vinylic monomer, (b) monomeric units of at least one amino-containing vinylic monomer having a primary or secondary amino group, (c) monomeric units of at least one polyethyleneglycol-containing vinylic monomer, and (d) monomeric units of at least one phosphorylcholine-containing vinylic monomer, wherein the sum of the amounts of components (a) and (b) in said at least one hydrophilic copolymer is about 40% by mole or less; and (3) heating the aqueous solution with the contact lens precursor therein at a temperature of from about 100° C. to about 140° C. for at least 30 minutes to form a coated contact lens having a hydrogel coating thereon, wherein the hydrogel coating is covalently attached onto the anterior and posterior surfaces through linkages each formed between on carboxylic acid group and one epoxy group, wherein the hydrogel coating comprises a crosslinked polymeric material comprising polymer chains derived from the hydrophilic copolymer.

The invention, in another aspect, provides a contact lens, preferably a silicone hydrogel contact lens, that comprises an anterior surface, an opposite posterior surface, and a layered structural configuration from the anterior surface to the posterior surface, wherein the layered structural configuration comprises an outer anterior surface hydrogel layer, an inner layer, and an outer posterior surface hydrogel layer, wherein the inner layer is a lens bulk material, wherein the outer anterior surface hydrogel layer and the outer posterior surface hydrogel layer comprise a crosslinked polymeric material comprising polymer chains derived from a hydrophilic copolymer that comprises (a) monomeric units of at least one epoxy-containing vinylic monomer, (b) monomeric units of at least one amino-containing vinylic monomer having a primary or secondary amino group, (c) monomeric units of at least one polyethyleneglycol-containing vinylic monomer, and (d) monomeric units of at least one phosphorylcholine-containing vinylic monomer, wherein the sum of the amounts of components (a) and (b) in said at least one hydrophilic copolymer is about 40% by mole or less, wherein the outer anterior surface hydrogel layer and the outer posterior surface hydrogel layer are covalently attached onto the inner layer through linkages each formed between on carboxylic acid group and one epoxy group, wherein the contact lens has a water-break-up time (WBUT) of at least 10 seconds.

These and other aspects of the invention including various preferred embodiments in any combination will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be effected without departing from the spirit and scope of the novel concepts of the disclosure.

BRIEF DESCRIPTION OF THE DRAWINGS

FIG. 1 schematically depicts a sectional view of the structural configuration of a contact lens according to a preferred embodiment of the invention.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

"About" as used herein in this application means that a number, which is referred to as "about", comprises the recited number plus or minus 1-10% of that recited number.

"Optional" or "optionally" means that the subsequently described event or circumstance can or cannot occur, and that the description includes instances where the event or circumstance occurs and instances where it does not.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a hard lens, a rigid gas permeable lens, a soft lens, or a hybrid lens.

The term "anterior surface", "front surface", "front curve surface" or "FC surface" in reference to a contact lens, as used in this application, interchangeably means a surface of the contact lens that faces away from the eye during wear. The anterior surface (FC surface) is typically substantially convex.

The "posterior surface", "back surface", "base curve surface" or "BC surface" in reference to a contact lens, as used in this application, interchangeably means a surface of the contact lens that faces towards the eye during wear. The posterior surface (BC surface) is typically substantially concave.

A "hard contact lens" refers a contact lens comprising a hard plastics (e.g., polymethylmethacrylate) as lens bulk (or so-called "core") material.

A "rigid gas permeable contact lens" refers to a contact lens comprising a gas permeable material (e.g., a material made from fluorosilicone acrylates) as lens bulk (or so-called "core") material.

A soft contact lens can be a non-silicone hydrogel contact lens or a silicone hydrogel contact lens. A "non-silicone hydrogel contact lens" refers to a contact lens comprising a non-silicone hydrogel bulk (or so-called "core") material. A "silicone hydrogel contact lens" or "SiHy" interchangeably refers to a contact lens comprising a silicone hydrogel bulk (or so-called "core") material.

A hybrid contact lens comprises a lens bulk material consisting essentially of a central optical zone that is made of a gas permeable lens material and a peripheral zone that is made of silicone hydrogel or regular hydrogel lens material and extends outwardly from and surrounds the central optical zone.

An embedded contact lens comprises a lens bulk material consisting essentially of a 3-dimensional embedded article and a non-silicone hydrogel material or a silicone hydrogel material, wherein the 3-dimensional embedded article is made of a non-hydrogel material and has a 3-dimensional size smaller than that of the contact lens so that it is partially or preferably completely embedded within a non-silicone hydrogel material or a silicone hydrogel material. A non-hydrogel material can be any material which absorbs less than 10% (preferably about 7.5% or less, more preferably about 5.0% or less, even more preferably about 2.5% or less) by weight of water when being fully hydrated.

A "hydrogel" or "hydrogel material" refers to a cross-linked polymeric material which is insoluble in water, but can hold at least 10 percent by weight of water in its three-dimensional polymer networks (i.e., polymer matrix) when it is fully hydrated.

As used in this application, the term "non-silicone hydrogel" refers to a hydrogel that is theoretically free of silicon.

A siloxane, which often also described as a silicone, refers to a molecule having at least one moiety of —Si—O—Si— where each Si atom carries two organic groups as substituents.

As used in this application, the term "silicone hydrogel" or "SiHy" interchangeably refers to a hydrogel containing silicone. A silicone hydrogel (SiHy) typically is obtained by copolymerization of a polymerizable composition comprising at least one silicone-containing vinylic monomer or at least one silicone-containing vinylic macromer or at least one silicone-containing prepolymer having ethylenically unsaturated groups.

"Hydrophilic," as used herein, describes a material or portion thereof that will more readily associate with water than with lipids.

The term "room temperature" refers to a temperature of about 22° C. to about 26° C. The term "soluble", in reference to a compound or material in a solvent, means that the compound or material can be dissolved in the solvent to give a solution with a concentration of at least about 0.5% by weight at room temperature (i.e., a temperature of about 22° C. to about 26° C.).

The term "insoluble", in reference to a compound or material in a solvent, means that the compound or material can be dissolved in the solvent to give a solution with a concentration of less than 0.01% by weight at room temperature (as defined above).

A "vinylic monomer" refers to a compound that has one sole ethylenically unsaturated group, is soluble in a solvent, and can be polymerized actinically or thermally.

As used in this application, the term "vinylic crosslinker" refers to a compound having at least two ethylenically unsaturated groups. A "vinylic crosslinking agent" refers to a subclass of vinylic crosslinkers each having a number average molecular weight of 700 Daltons or less.

The term "ethylenically unsaturated group" is employed herein in a broad sense and is intended to encompass any groups containing at least one >C=CH$_2$ group. Exemplary ethylenically unsaturated groups include without limitation (meth)acryloyl

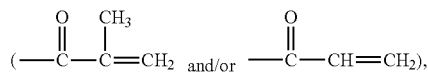

vinyloxycarbonylamino

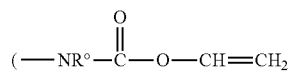

in which R° is H or C$_1$-C$_4$ alkyl), vinyloxycarbonyloxy

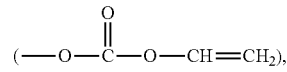

allyl, vinyl, styrenyl, or other C=C containing groups.

An "acrylic monomer" refers to a vinylic monomer having one sole (meth)acryloyl group. Examples of acrylic monomers includes (meth)acryloxy [or (meth)acryloyloxy] monomers and (meth)acrylamido monomers.

An "(meth)acryloxy monomer" or "(meth)acryloyloxy monomer" refers to a vinylic monomer having one sole group of

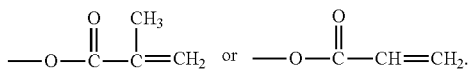

An "(meth)acrylamido monomer" refers to a vinylic monomer having one sole group of

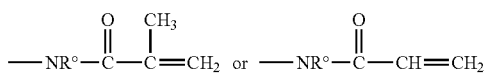

in which $R°$ is H or $C_1$-$C_4$ alkyl.

The term "(meth)acrylamide" refers to methacrylamide and/or acrylamide.

The term "(meth)acrylate" refers to methacrylate and/or acrylate.

An "N-vinyl amide monomer" refers to an amide compound having a vinyl group (—CH=$CH_2$) that is directly attached to the nitrogen atom of the amide group.

The term "ene group" refers to a monovalent radical of $CH_2$=CH— or $CH_2$=$CCH_3$— that is not covalently attached to an oxygen or nitrogen atom or a carbonyl group.

An "ene monomer" refers to a vinylic monomer having one sole ene group.

A "vinyloxycarbonylamino monomer" refers to a vinylic monomer having one sole vinyloxycarbonylamino group.

A "vinylaminocarbonyloxy monomer" refers to a vinylic monomer having one sole vinylaminocarbonyloxy group.

A "vinylaminocarbonylamino monomer" refers to a vinylic monomer having one sole vinylaminocarbonylamino group.

A "hydrophilic vinylic monomer" refers to any vinylic monomer which typically yields a homopolymer that is water-soluble or can absorb at least 10 percent by weight of water.

A "hydrophobic vinylic monomer" refers to any vinylic monomer which typically yields a homopolymer that is insoluble in water and can absorb less than 10% by weight of water.

An "acrylic crosslinker" refers to a vinylic crosslinker having at least two (meth)acryloyl groups.

The term "acrylic repeating units" refers to repeating units of a polymeric material, each of which is derived from an acrylic monomer or crosslinker in a free-radical polymerization to form the polymeric material.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV/visible irradiation, ionizing radiation (e.g. gamma ray or X-ray irradiation), microwave irradiation, and the like. Thermal curing or actinic curing methods are well-known to a person skilled in the art.

A "blending vinylic monomer" refers to a vinylic monomer capable of dissolving both hydrophilic and hydrophobic polymerizable components of a polymerizable composition to form a solution.

A "silicone-containing vinylic monomer or crosslinker" or a "siloxane-containing vinylic monomer or crosslinker" interchageably refers to a vinylic monomer or crosslinker having at least one moiety of —Si—O—Si— where each Si atom carries at least two substituents (organic groups).

The term "terminal ethylenically-unsaturated group" refers to one ethylenically-unsaturated group at one of the two ends of the main chain (or backbone) of an organic compound as known to a person skilled in the art. The term "terminal (meth)acryloyl group" refers to one (meth)acryloyl group at one of the two ends of the main chain (or backbone) of an organic compound as known to a person skilled in the art.

A "polysiloxane segment" or "polydiorganosiloxane segment" interchangeably refers to a polymer chain segment (i.e., a divalent radical) of

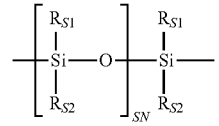

in which SN is an integer of 3 or larger and each of $R_{s1}$ and $R_{s2}$ independent of one another are selected from the group consisting of: $C_1$-$C_{10}$ alkyl; phenyl; $C_1$-$C_4$-alkyl-substituted phenyl; $C_1$-$C_4$-alkoxy-substituted phenyl; phenyl-$C_1$-$C_6$-alkyl; $C_1$-$C_{10}$ fluoroalkyl; $C_1$-$C_{10}$ fluoroether; aryl; aryl $C_1$-$C_{18}$ alkyl; alk-$(OC_2H_4)_{\gamma 1}$—$OR°$ (in which alk is $C_1$-$C_6$ alkylene diradical, $R°$ is H or $C_1$-$C_4$ alkyl and γ1 is an integer from 1 to 10); a $C_2$-$C_{40}$ organic radical having at least one functional group selected from the group consisting of hydroxyl group (—OH), carboxyl group (—COOH), amino group (—$NR_{N1}R_{N1'}$), amino linkages of —$NR_{N1}$—, amide linkages of —$CONR_{N1}$—, amide of —$CONR_{N1}R_{N1}'$, urethane linkages of —OCONH—, and $C_1$-$C_4$ alkoxy group, and a linear hydrophilic polymer chain, in which $R_{N1}$ and $R_{N1}'$ independent of each other are hydrogen or a $C_1$-$C_{15}$ alkyl.

A "polydiorganosiloxane vinylic monomer" or "polysiloxane vinylic monomer" interchangeably refers to a compound comprising at least one polysiloxane segment and one sole ethylenically-unsaturated group.

A "polydiorganosiloxane vinylic crosslinker" or "polysiloxane vinylic crosslinker" interchangeably refers to a compound comprising at least one polysiloxane segment and at least two ethylenically-unsaturated groups.

A "linear polydiorganosiloxane vinylic crosslinker" or "linear polysiloxane vinylic crosslinker" interchangeably refers to a compound comprising a main chain which includes at least one polysiloxane segment and is terminated with one ethylenically-unsaturated group at each of the two ends of the main chain.

A "chain-extended polydiorganosiloxane vinylic crosslinker" or "chain-extended polysiloxane vinylic crosslinker" interchangeably refers to a compound comprising at least two ethylenically-unsaturated groups and at least two polysiloxane segments each pair of which are linked by one divalent radical.

The term "fluid" as used herein indicates that a material is capable of flowing like a liquid.

As used in this application, the term "clear" in reference to a polymerizable composition means that the polymerizable composition is a transparent solution or liquid mixture having a light transmissibility of 85% or greater (preferably 90% or greater) in the range between 400 to 700 nm.

A "macromer" or "prepolymer" refers to a compound or polymer comprising ethylenically unsaturated groups and having a number average molecular weight of greater than 700 Daltons.

As used in this application, the term "polymer" means a material formed by polymerizing or crosslinking one or more monomers, macromers, prepolymers, or combinations thereof.

As used in this application, the term "molecular weight" of a polymeric material (including monomeric or macromeric materials) refers to the number-average molecular weight unless otherwise specifically noted or unless testing conditions indicate otherwise. A skilled person knows how to determine the molecular weight of a polymer according to known methods, e.g., GPC (gel permeation chromatography) with one or more of a refractive index detector, a low-angle laser light scattering detector, a multi-angle laser light scattering detector, a differential viscometry detector, a UV detector, and an infrared (IR) detector; MALDI-TOF MS (matrix-assisted laser desorption/ionization time-of-flight mass spectroscopy); $^1$H NMR (Proton nuclear magnetic resonance) spectroscopy, etc.

The term "monovalent radical" refers to an organic radical that is obtained by removing a hydrogen atom from an organic compound and that forms one bond with one other group in an organic compound. Examples include without limitation, alkyl (by removal of a hydrogen atom from an alkane), alkoxy (or alkoxyl) (by removal of one hydrogen atom from the hydroxyl group of an alkyl alcohol), thiyl (by removal of one hydrogen atom from the thiol group of an alkylthiol), cycloalkyl (by removal of a hydrogen atom from a cycloalkane), cycloheteroalkyl (by removal of a hydrogen atom from a cycloheteroalkane), aryl (by removal of a hydrogen atom from an aromatic ring of the aromatic hydrocarbon), heteroaryl (by removal of a hydrogen atom from any ring atom), amino (by removal of one hydrogel atom from an amine), etc.

The term "divalent radical" refers to an organic radical that is obtained by removing two hydrogen atoms from an organic compound and that forms two bonds with other two groups in an organic compound. For example, an alkylene divalent radical (i.e., alkylenyl) is obtained by removal of two hydrogen atoms from an alkane, a cycloalkylene divalent radical (i.e., cycloalkylenyl) is obtained by removal of two hydrogen atoms from the cyclic ring.

In this application, the term "substituted" in reference to an alkyl or an alkylenyl means that the alkyl or the alkylenyl comprises at least one substituent which replaces one hydrogen atom of the alkyl or the alkylenyl and is selected from the group consisting of hydroxyl (—OH), carboxyl (—COOH), —NH$_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, and combinations thereof.

The term "alkyl" refers to a monovalent radical obtained by removing a hydrogen atom from a linear or branched alkane compound. An alkyl group (radical) forms one bond with one other group in an organic compound.

The term "alkylene divalent group" or "alkylene diradical" or "alkyl diradical" interchangeably refers to a divalent radical obtained by removing one hydrogen atom from an alkyl. An alkylene divalent group forms two bonds with other groups in an organic compound.

The term "alkoxy" or "alkoxyl" refers to a monovalent radical obtained by removing the hydrogen atom from the hydroxyl group of a linear or branched alkyl alcohol. An alkoxy group (radical) forms one bond with one other group in an organic compound.

As used in this application, the term "amino group" refers to a primary or secondary amino group of formula —NHR', where R' is hydrogen or a $C_1$-$C_{20}$ unsubstituted or substituted, linear or branched alkyl group, unless otherwise specifically noted.

As used in this application, the term "phosphorylcholine" refers to a zwitterionic group of

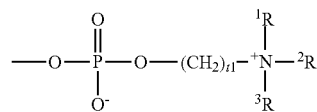

in which t1 is an integer of 1 to 5 and $^1$R, $^2$R and $^3$R independently of each other are $C_1$-$C_8$ alkyl or $C_1$-$C_8$ hydroxyalkyl.

As used in this application, the term "carboxyl-containing vinylic monomer" refers to any vinylic monomer having a carboxyl group (—COOH); the term "amino-containing vinylic monomer" refers to any vinylic monomer having an amino group (—NHR' in which R' is H or $C_1$-$C_4$ alkyl); the term "epoxy-containing vinylic monomer" refers to any vinylic monomer having a monovalent radical of an epoxide

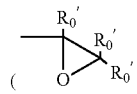

in which each $R_0'$ independent of one another is H or $C_1$-$C_4$ alkyl); the term "phosphorylcholine-containing vinylic monomer" refers to any vinylic monomer having a phosphorylcholine group; the term "polyethyleneglycol-containing vinylic monomer" refers to any vinylic monomer having a polyethyleneglycol group of

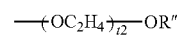

in which R" is H or $C_1$-$C_4$ alkyl; t2 is an integer from 3 to 100.

As used in this application, the term "non-reactive vinylic monomer" refers to any vinylic monomer free of carboxyl group, primary amino group, secondary amino group, epoxide group, isocyanate group, azlactone group, aldehyde group, azetidinium group, or aziridine group.

A free radical initiator can be either a photoinitiator or a thermal initiator. A "photoinitiator" refers to a chemical that initiates free radical crosslinking/polymerizing reaction by the use of light. A "thermal initiator" or "thermal free radical initiator" interchangeably refers to a chemical that initiates free radical crosslinking/polymerizing reaction by the use of heat energy.

The intrinsic "oxygen permeability", $Dk_i$, of a material is the rate at which oxygen will pass through a material. As used in this application, the term "oxygen permeability (Dk)" in reference to a hydrogel (silicone or non-silicone) or a contact lens means a corrected oxygen permeability ($Dk_c$) which is measured at about 34-35° C. and corrected for the surface resistance to oxygen flux caused by the boundary layer effect according to the procedures described in ISO 18369-4. Oxygen permeability is conventionally expressed in units of barrers, where "barrer" is defined as $[(cm^3 \text{ oxygen})(cm)/(cm^2)(sec)(mm \text{ Hg})] \times 10^{-9}$.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as $[(cm^3 \text{ oxygen})/(cm^2)(sec)(mm \text{ Hg})] \times 10^{-9}$.

The term "modulus" or "elastic modulus" in reference to a contact lens or a material means the tensile modulus or Young's modulus which is a measure of the stiffness of a contact lens or a material in tension. A person skilled in the art knows well how to determine the elastic modulus of a SiHy material or a contact lens. For example, all commercial contact lenses have reported values of elastic modulus.

A "coating" in reference to a contact lens means that the contact lens has, on its surfaces, a thin layer of a material that is different from the bulk material of the contact lens and obtained by subjecting the contact lens to a surface treatment.

"Surface modification" or "surface treatment", as used herein, means that an article has been treated in a surface treatment process, in which (1) a coating is applied to the surface of the article, (2) chemical species are adsorbed onto the surface of the article, (3) the chemical nature (e.g., electrostatic charge) of chemical groups on the surface of the article are altered, or (4) the surface properties of the article are otherwise modified. Exemplary surface treatment processes include, but are not limited to, a surface treatment by energy (e.g., a plasma, a static electrical charge, irradiation, or other energy source), chemical treatments, the grafting of hydrophilic vinylic monomers or macromers onto the surface of an article, mold-transfer coating process disclosed in U.S. Pat. No. 6,719,929, the incorporation of wetting agents into a lens formulation for making contact lenses proposed in U.S. Pat. Nos. 6,367,929 and 6,822,016, reinforced mold-transfer coating disclosed in U.S. Pat. No. 7,858,000, and a hydrophilic coating composed of covalent attachment or physical deposition of one or more layers of one or more hydrophilic polymer onto the surface of a contact lens disclosed in U.S. Pat. Nos. 8,147,897, 8,409,599, 8,557,334, 8,529,057, and 9,505,184.

"Post-curing surface treatment", in reference to a lens bulk material or a contact lens, means a surface treatment process that is performed after the lens bulk material or the contact lens is formed by curing (i.e., thermally or actinically polymerizing) a a polymerizable composition.

A "hydrophilic surface" in reference to a silicone hydrogel material or a contact lens means that the silicone hydrogel material or the contact lens has a surface hydrophilicity characterized by having an averaged water contact angle of about 90 degrees or less, preferably about 80 degrees or less, more preferably about 70 degrees or less, more preferably about 60 degrees or less.

An "average contact angle" refers to a water contact angle (static water contact angle measured by Sessile Drop), which is obtained by averaging measurements of at least 3 individual contact lenses.

"Ophthalmically compatible", as used herein, refers to a material or surface of a material which may be in intimate contact with the ocular environment for an extended period of time without significantly damaging the ocular environment and without significant user discomfort.

The term "ophthalmically safe" with respect to a packaging solution for sterilizing and storing contact lenses is meant that a contact lens stored in the solution is safe for direct placement on the eye without rinsing after autoclave and that the solution is safe and sufficiently comfortable for daily contact with the eye via a contact lens. An ophthalmically-safe packaging solution after autoclave has a tonicity and a pH that are compatible with the eye and is substantially free of ocularly irritating or ocularly cytotoxic materials according to international ISO standards and U.S. FDA regulations.

The term "water gradient" in reference to a contact lens means that there is an increase in water content observed in passing from the core to the surface of the contact lens, reaching the highest water content in the region near and including the surface of the contact lens. It is understood that the increase in water content from the core to the surface of the contact lens can be continuous and/or step-wise, so long as the water content is highest in the region near and including the surface of the contact lens.

As used in this application, the term "cross section" of a contact lens refers to a lens section obtained by cutting through the lens with a knife or cutting tool at an angle substantially normal to either of the anterior and posterior surfaces of the lens. A person skilled in the art knows well to cut manually (i.e., hand cut), or with Cryosta Microtome or with a lathe, a contact lens to obtain a cross section of the contact lens. A resultant cross section of a contact lens can be polished by using ion etching or similar techniques.

As used in this application, the term "equilibrium water content" in reference to a contact lens or a polymeric material means the amount (expressed as percent by weight) of water present in the contact lens or the polymeric material when being fully hydrated (equilibrated) in phosphate buffered saline solution (ca. 0.79 wt % NaCl) and determined at room temperature (as defined above).

As used in this application, the term "crosslinked coating" or "hydrogel coating" or "hydrogel layer" on a contact lens interchangeably is used to describe a crosslinked polymeric material having a three-dimensional network that can contain water when fully hydrated. The three-dimensional network of a crosslinked polymeric material can be formed by crosslinking of two or more linear or branched polymers through crosslinkages.

As used in this application, the term "lens bulk material" in reference to a contact lens interchangeably means a layer that has a 3-dimensional shape of a contact lens and includes a central curved plane (which divides the contact lens into two parts, one containing the anterior surface and the other containing the posterior surface) and has a variable thickness.

As used in this application, the term "outer surface hydrogel layer" in reference to a contact lens means an outmost hydrogel layer underneath the surface of the contact lens, which consists of an outer anterior surface hydrogel layer and an outer posterior surface hydrogel layer and which fully covers the lens bulk material. An "outer anterior surface hydrogel layer" in reference to a contact lens means an outmost hydrogel layer underneath the anterior surface of the contact lens. An "outer posterior surface hydrogel layer" in reference to a contact lens means an outmost hydrogel layer underneath the posterior surface of the contact lens. It is understood that the anterior surface consists of the same material as the outer anterior surface hydrogel layer while the posterior surface consists of the same material as the outer posterior surface hydrogel layer.

As used in this application, the term "transition layer" in reference to a contact lens means a layer of polymeric material that is located between the inner layer (or the lens bulk material) and one of the anterior and posterior outer hydrogel layers.

FIG. 1 schematically illustrates a contact lens of the invention, according to a preferred embodiment. In accordance with this preferred embodiment of the invention, the contact lens 100 has an anterior surface (or front curve or convex surface) 101 and an opposite posterior surface (or base curve or concave surface) 102 which is rest on the cornea of the eye when worn by a user. The contact lens 100 comprises a lens bulk material 110, an outer anterior surface hydrogel layer 120 and an outer posterior surface hydrogel layers 120. The lens bulk material 110 has a 3-dimensional shape very close to the contact lens 100. The outer anterior and posterior surface hydrogel layers 120 are made of a hydrogel material substantially free of silicone (preferably totally free of silicone) having a higher water content relative to that of the inner layer 110. The anterior and posterior outer hydrogel layers 120 merge at the peripheral edge 103 of the contact lens 100 and cover completely the inner layer 110.

The invention is generally related to a method for making coated contact lenses, especially coated SiHy contact lenses, in a cost-effective and time-efficient manner. A coated contact lens produced according to a method of the invention comprises an anterior surface, an opposite posterior surface, and a layered structural configuration from the anterior surface to the posterior surface, wherein the layered structural configuration comprises an outer anterior surface hydrogel layer, an inner layer, and an outer posterior surface hydrogel layer, wherein the inner layer is a lens bulk material, wherein the outer anterior surface hydrogel layer and the outer posterior surface hydrogel layer comprise a crosslinked polymeric material comprising polymer chains derived from a hydrophilic copolymer that comprises (a) monomeric units of at least one epoxy-containing vinylic monomer, (b) monomeric units of at least one amino-containing vinylic monomer having a primary or secondary amino group, (c) monomeric units of at least one polyethyleneglycol-containing vinylic monomer, and (d) monomeric units of at least one phosphorylcholine-containing vinylic monomer, wherein the sum of the amounts of components (a) and (b) in said at least one hydrophilic copolymer is about 40% by mole or less, wherein the outer anterior surface hydrogel layer and the outer posterior surface hydrogel layer are covalently attached onto the inner layer through linkages each formed between on carboxylic acid group and one epoxy group, wherein the contact lens has a water-break-up time (WBUT) of at least 10 seconds.

The invention is partly based on the discoveries that a coated contact lens with a hydrogel coating thereon can be made by autoclaving a contact lens precursor with carboxylic acid groups thereon directly in a lens package containing the contact lens precursor immersed in a lens packaging solution including a hydrophilic copolymer comprising (a) epoxy-containing monomeric units, (b) amino-containing monomeric units, (c) phosphorylcholine-containing monomeric units, and (d) polyethyleneglycol-containing monomeric units, wherein the sum of the amounts of components (a) and (b) in said at least one hydrophilic copolymer is about 40% by mole or less. Typically, contact lenses, which are hydrated and packaged in a packaging solution, must be sterilized. Sterilization of the hydrated lenses during manufacturing and packaging is typically accomplished by autoclaving. The autoclaving process involves heating the packaging of a contact lens to a temperature of from about 118° C. to about 125° C. for at least 30 minutes under pressure. It is discovered that during autoclave a hydrogel coating can be formed on a contact lens precursor with carboxylic acid groups thereon so that imparts to the resultant coated contact lens with a superior lens surface hydrophilicity.

It is believed that the amino groups and quaternary ammonium groups of the hydrophilic copolymer can enhance the binding of the hydrophilic copolymer onto the surfaces of a contact lens precursor through hydrogen bonds and ionic interactions while the epoxy groups of the hydrophilic copolymer can react, during autoclave, with the carboxylic acid groups on the surfaces of the contact lens precursor to form the covalent linkages to attach covalently a layer of the hydrophilic copolymer onto the contact lens precursor. It is also believed that inter- and intra-molecular reactions can also occur between epoxy and amino groups within same molecules and between molecules of the hydrophilic copolymer to form a hydrogel coating on the contact lens precursor during autoclave. Because of dangling hydrophilic polyethyleneglycol chains and dangling hydrophilic zwitterionic phosphorylcholine groups, the resultant hydrogel coating can provide the resultant coated contact lens with a superior surface hydrophilicity.

In one aspect, the invention provides a method for making coated contact lenses, comprising the steps of: (1) obtaining a contact lens precursor which has a concave surface and an opposite convex surface and comprises a lens bulk material and carboxylic acid groups on and/or near the anterior and posterior surfaces; (2) immersing the contact lens precursor in an aqueous solution in a container, wherein the aqueous solution comprises from about 0.01% to about 5.0% (preferably from about 0.05% to about 4.0%, more preferably from about 0.1% to about 3%, even more preferably from about 0.2% to about 2.5%) by weight of at least one hydrophilic copolymer that comprises (a) monomeric units of at least one epoxy-containing vinylic monomer, (b) monomeric units of at least one amino-containing vinylic monomer having a primary or secondary amino group, (c) monomeric units of at least one polyethyleneglycol-containing vinylic monomer, and (d) monomeric units of at least one phosphorylcholine-containing vinylic monomer, wherein the sum of the amounts of components (a) and (b) in said at least one hydrophilic copolymer is about 40% or less (preferably about 35% or less, more preferably about 30% or less, even more preferably about 25% or less) by mole; and (3) heating the aqueous solution with the contact lens precursor therein at a temperature of from about 100° C. to about 140° C. for at least 30 minutes to form a coated contact lens having a hydrogel coating thereon, wherein the hydrogel coating is covalently attached onto the anterior and posterior surfaces through linkages each formed between on carboxylic acid group and one epoxy group, wherein the hydrogel coating comprises a crosslinked polymeric material comprising polymer chains derived from the hydrophilic copolymer.

The invention, in another aspect, provides a contact lens, preferably a silicone hydrogel contact lens, that comprises an anterior surface, an opposite posterior surface, and a layered structural configuration from the anterior surface to the posterior surface, wherein the layered structural configuration comprises an outer anterior surface hydrogel layer, an inner layer, and an outer posterior surface hydrogel layer, wherein the inner layer comprises a lens bulk material and has carboxylic acid groups on and/or near the surfaces of the inner layer, wherein the outer anterior surface hydrogel layer and the outer posterior surface hydrogel layer comprise a crosslinked polymeric material comprising polymer chains derived from a hydrophilic copolymer that comprises monomeric units of (a) at least one epoxy-containing vinylic monomer, (b) at least one amino-containing vinylic monomer having a primary or secondary amino group, (c) at least one polyethyleneglycol-containing vinylic monomer, and (d) at least one phosphoryl-choline-containing vinylic monomer, wherein the sum of the amounts of components (a) and (b) in said at least one hydrophilic copolymer is about 40% or less (preferably about 35% or less, more preferably about 30% or less, even more preferably about 25% or less) by mole, wherein the outer anterior and posterior surface hydrogel layers are covalently attached onto the inner layer through linkages each formed between one carboxylic acid group and one epoxy group, wherein the contact lens has a water-break-up time (WBUT) of at least 10, preferably at least 12.5, more preferably at least 15, even more preferably at least 17.5 seconds.

In accordance with all the various aspects of the invention, a contact lens precursor or an inner layer of the invention can be derived directly from a preformed contact lens. A preformed contact lens can be any contact lens which has not been subjected to any surface treatment after being produced according to any lens manufacturing processes, any contact lens which has been plasma treated or treated with any chemical or physical surface modification, or any commercial contact lens, so long as it does not have a hydrogel coating on the surface of the preformed contact lens. A person skilled in the art knows very well how to make preformed contact lenses. A person skilled in the art knows very well how to make preformed contact lenses. For example, preformed contact lenses can be produced in a conventional "spin-casting mold," as described for example in U.S. Pat. No. 3,408,429, or by the full cast-molding process in a static form, as described in U.S. Pat. Nos. 4,347,198; 5,508,317; 5,583,463; 5,789,464; and 5,849,810, or by lathe cutting of polymeric material buttons as used in making customized contact lenses. In cast-molding, a polymerizable composition (i.e., a lens formulation) typically is dispensed into molds and cured (i.e., polymerized and/or crosslinked) in molds for making contact lenses.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with the polymerizable composition.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. Nos. 4,444,711; 4,460,534; 5,843,346; and 5,894,002.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, New Jersey), or the like can be used. Other materials that allow UV light transmission could be used, such as quartz glass and sapphire.

In a preferred embodiment, reusable molds are used and the lens-forming composition is cured actinically under a spatial limitation of actinic radiation to form a contact lens. Examples of preferred reusable molds are those disclosed in U.S. Pat. Nos. 6,627,124, 6,800,225, 7,384,590, and 7,387,759. Reusable molds can be made of quartz, glass, sapphire, $CaF_2$, a cyclic olefin copolymer (e.g., Topas® COC grade 8007-S10 (clear amorphous copolymer of ethylene and norbornene) from Ticona GmbH of Frankfurt, Germany and Summit, New Jersey, Zeonex® and Zeonor® from Zeon Chemicals LP, Louisville, KY), polymethylmethacrylate (PMMA), polyoxymethylene from DuPont (Delrin), Ultem® (polyetherimide) from G.E. Plastics, PrimoSpire®, etc.

In accordance with the invention, the polymerizable composition can be introduced (dispensed) into a cavity formed by a mold according to any known methods.

After the polymerizable composition is dispensed into the mold, it is polymerized to produce a contact lens. Crosslinking may be initiated thermally or actinically, preferably by exposing the polymerizable composition in the mold to a spatial limitation of actinic radiation to crosslink the polymerizable components in the polymerizable composition.

Opening of the mold so that the molded article can be removed from the mold may take place in a manner known per se.

The molded contact lens can be subject to lens extraction to remove unpolymerized polymerizable components. The extraction solvent can be any solvent known to a person skilled in the art. Examples of suitable extraction solvent are those described below.

In a preferred embodiment, a preformed contact lens is a hard contact lens comprising a hard plastic material as lens bulk material. Preferably, the hard plastic material is a crosslinked polymethylacrylate. A person skilled in the art knows well how to make a hard plastic material, including a crosslinked polymethylmethacrylate.

In another preferred embodiment, a preformed contact lens is a rigid gas permeable contact lens comprising a rigid gas permeable material as lens bulk material. A person skilled in the art knows how to make a rigid gas permeable contact lens.

In another preferred embodiment, a preformed contact lens is a hybrid contact lens comprises a lens bulk material consisting essentially of a central optical zone that is made of a gas permeable lens material and a peripheral zone that is made of silicone hydrogel or regular hydrogel lens material and extends outwardly from and surrounds the central optical zone.

In another preferred embodiment, a preformed contact lens is a non-silicone hydrogel contact lens (or so-called a conventional hydrogel contact lens) comprising a non-silicone hydrogel material as lens bulk material.

Preformed non-silicone hydrogel contact lenses can be any commercially-available non-silicone hydrogel contact lenses or can be produced according to any known methods. For example, for production of preformed non-silicone hydrogel contact lenses, a non-silicone hydrogel lens formulation for cast-molding or spin-cast molding or for making rods used in lathe-cutting of contact lenses typically is: either (1) a monomer mixture comprising (a) at least one hydrophilic vinylic monomer (e.g., hydroxyethyl methacrylate, glycerol methacrylate, N-vinylpyrrolidone, or combinations thereof) and (b) at least one component selected from the group consisting of a crosslinking agent, a hydrophobic vinylic monomer, a lubricating agent (or so-called internal wetting agents incorporated in a lens formulation), a free-radical initiator (photoinitiator or thermal initiator), a UV-absorbing vinylic monomer, a high-energy-violet-light ("HEVL") absorbing vinylic monomer, a visibility tinting agent (e.g., reactive dyes, polymerizable dyes, pigments, or mixtures thereof), antimicrobial agents (e.g., preferably silver nanoparticles), a bioactive agent, and combinations thereof; or (2) an aqueous solution comprising one or more water-soluble prepolymers and at least one component selected from the group consisting of hydrophilic vinylic monomer, a crosslinking agent, a hydrophobic vinylic monomer, a lubricating agent (or so-called internal wetting agents incorporated in a lens formulation), a free-radical initiator (photoinitiator or thermal initiator), a UV-absorbing vinylic monomer, a HEVL absorbing vinylic monomer, a visibility tinting agent (e.g., reactive dyes, polymerizable dyes, pigments, or mixtures thereof), antimicrobial agents (e.g., preferably silver nanoparticles), a bioactive agent, and combinations thereof. Resultant preformed hydrogel contact lenses then can be subjected to extraction with an extraction solvent to remove unpolymerized components from the resultant lenses and to hydration process, as known by a person skilled in the art. It is understood that a lubricating agent present in a hydrogel lens formulation can improve the lubricity of preformed hydrogel contact lenses compared to the lubricity of control preformed hydrogel contact lenses obtained from a control hydrogel lens formulation without the lubricating agent.

Preferred examples of water-soluble prepolymers include without limitation: a water-soluble crosslinkable poly(vinyl alcohol) prepolymer described in U.S. Pat. Nos. 5,583,163 and 6,303,687

Numerous non-silicone hydrogel lens formulations have been described in numerous patents and patent applications published by the filing date of this application and have been used in producing commercial non-silicone hydrogel contact lenses. Examples of commercial non-silicone hydrogel contact lenses include, without limitation, alfafilcon A, acofilcon A, deltafilcon A, etafilcon A, focofilcon A, helfilcon A, helfilcon B, hilafilcon B, hioxifilcon A, hioxifilcon B, hioxifilcon D, methafilcon A, methafilcon B, nelfilcon A, nesofilcon A, ocufilcon A, ocufilcon B, ocufilcon C, ocufilcon D, omafilcon A, phemfilcon A, polymacon, samfilcon A, telfilcon A, tetrafilcon A, and vifilcon A.

In a preferred embodiment, the lens bulk material is composed of a non-silicone hydrogel material which comprises at least 50% by mole of repeating units of at least one hydroxyl-containing vinylic monomer, preferably selected from the group consisting of hydroxyethyl (meth)acrylate, glycerol (meth)acrylate, 3-hydroxypropyl (meth)acrylate, 2-hydroxypropyl (meth)acrylate, 3-amino-2-hydroxypropyl (meth)acrylate, N-2-hydroxyethyl (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, vinyl alcohol, allyl alcohol, and combinations thereof, more preferably selected from the group consisting of hydroxyethyl (meth)acrylate, glycerol (meth)acrylate, and vinyl alcohol. The mole percentages of repeating units can be calculated based on a non-silicone hydrogel lens formulation for making the non-silicone hydrogel contact lens.

In another preferred embodiment, a preformed contact lens is a silicone hydrogel contact lens comprising a silicone hydrogel material as lens bulk material.

Preformed silicone hydrogel contact lenses can be any commercially-available silicone hydrogel contact lenses or can be produced according to any known methods. For example, for production of preformed silicone hydrogel (SiHy) contact lenses, a SiHy lens formulation for cast-molding or spin-cast molding or for making SiHy rods used in lathe-cutting of contact lenses generally comprises (1) at least one hydrophilic vinylic monomer (any one or more of those described later in this application), (2) at least one vinylic crosslinker that comprises at least one polysiloxane vinylic crosslinker (any one or more of those described later in this application) and/or at least one non-silicone vinylic crosslinker (any one or more of those described later in this application), (3) at least one siloxane-containing vinylic monomer (any one or more of those described later in this application), (4) a free-radical initiator (photoinitiator or thermal initiator), and (5) at least one component selected from the group consisting of a hydrophobic non-silicone vinylic monomer (any one or more of those described later in this application), a UV-absorbing vinylic monomer, a UV/HEVL-absorbing vinylic monomer, a polymerizable visibility tinting agent (i.e., a polymerizable dye), and combinations thereof. Resultant preformed SiHy contact lenses then can be subjected to extraction with an extraction solvent to remove unpolymerized components from the resultant lenses and to hydration process, as known by a person skilled in the art. In addition, a preformed SiHy contact lens can be a colored contact lens (i.e., a SiHy contact lens having at least one colored patterns printed thereon as well known to a person skilled in the art).

Any hydrophilic vinylic monomers can be used in the invention. Examples of preferred hydrophilic vinylic monomers are alkyl (meth)acrylamides (as described later in this application), hydroxyl-containing acrylic monomers (as described below), amino-containing acrylic monomers (as described later in this application), carboxyl-containing acrylic monomers (as described later in this application), N-vinyl amide monomers (as described later in this application), methylene-containing pyrrolidone monomers (i.e., pyrrolidone derivatives each having a methylene group connected to the pyrrolidone ring at 3- or 5-position) (as described later in this application), acrylic monomers having a $C_1$-$C_4$ alkoxyethoxy group (as described later in this application), vinyl ether monomers (as described later in this application), allyl ether monomers (as described later in this application), phosphorylcholine-containing vinylic monomers (as described later in this application), N-2-hydroxyethyl vinyl carbamate, N-carboxyvinyl-β-alanine (VINAL), N-carboxyvinyl-α-alanine, and combinations thereof.

In accordance with the invention, any non-silicone vinylic crosslinkers can be in this invention. Examples of preferred non-silicone vinylic cross-linking agents are described later in this application.

In accordance with the invention, any polysiloxane vinylic crosslinkers can be used in this invention. Examples of preferred polysiloxane vinylic crosslinkers include without limitation α,ω-(meth)acryloxy-terminated polydimethylsiloxanes of various molecular weight; α,ω-(meth)acrylamido-terminated polydimethylsiloxanes of various molecular weight; α,ω-vinyl carbonate-terminated polydimethylsiloxanes of various molecular weight; α,ω-vinyl carbamate-terminated polydimethylsiloxane of various molecular weight; bis-3-methacryloxy-2-hydroxypropyloxypropyl polydimethylsiloxane of various molecular weight; N,N,N',N'-tetrakis(3-methacryloxy-2-hydroxypropyl)-alpha,omega-bis-3-aminopropyl-polydimethylsiloxane of various molecular weight; the reaction products of glycidyl methacrylate with amino-functional polydimethylsiloxanes; the reaction products of an azlactone-containing vinylic monomer (any one of those described above) with hydroxyl-functional polydimethylsiloxanes; polysiloxane-containing macromer selected from the group consisting of Macromer A, Macromer B, Macromer C, and Macromer D described in U.S. Pat. No. 5,760,100; polysiloxane vinylic crosslinkers disclosed in U.S. Pat. Nos. 4,136,250, 4,153, 641, 4,182,822, 4,189,546, 4,259,467, 4,260,725, 4,261,875, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,449,729, 5,451,617, 5,486,579, 5,962,548, 5,981,675, 6,039,913, 6,762,264, 7,423,074, 8,163,206, 8,480,227, 8,529,057, 8,835,525, 8,993,651, 9,187,601, 10,081,697, 10,301,451, and 10,465,047.

One class of preferred polysiloxane vinylic crosslinkers are di-(meth)acryloyloxy-terminated polysiloxane vinylic crosslinkers each having dimethylsiloxane units and hydrophilized siloxane units each having one methyl substituent and one monovalent $C_4$-$C_{40}$ organic radical substituent having 2 to 6 hydroxyl groups, more preferably a polysiloxane vinylic crosslinker of formula (H), are described later in this application and can be prepared according to the procedures disclosed in U.S. Pat. No. 10,081,697.

Another class of preferred polysiloxane vinylic crosslinkers are vinylic crosslinkers each of which comprises one sole polysiloxane segment and two terminal (meth)acryloyl groups, which can be obtained from commercial suppliers; prepared by reacting glycidyl (meth)acrylate (meth)acryloyl chloride with a di-amino-terminated polydimethylsiloxane or a di-hydroxyl-terminated polydimethylsiloxane; prepared by reacting isocyantoethyl (meth)acrylate with di-hydroxyl-terminated polydimethylsiloxanes prepared by reacting an amino-containing acrylic monomer with di-carboxyl-terminated polydimethylsiloxane in the presence of a coupling agent (a carbodiimide); prepared by reacting a carboxyl-containing acrylic monomer with di-amino-terminated polydimethylsiloxane in the presence of a coupling agent (a carbodiimide); or prepared by reacting a hydroxyl-containing acrylic monomer with a dihydroxy-terminated polydisiloxane in the presence of a diisocyanate or diepoxy coupling agent.

Other classes of preferred polysiloxane vinylic crosslinkers are chain-extended polysiloxane vinylic crosslinkers each of which has at least two polysiloxane segments linked by a linker between each pair of polysiloxane segments and two terminal ethylenically unsaturated groups, which can be prepared according to the procedures described in U.S. Pat. Nos. 5,034,461, 5,416,132, 5,449,729, 5,760,100, 7,423, 074, 8,529,057, 8,835,525, 8,993,651, 9,187,601, 10,301, 451, and 10,465,047.

Any siloxane-containing vinylic monomer can be used in the invention. Examples of preferred siloxane-containing vinylic monomers can be siloxane-containing (meth)acrylamido monomers, siloxane-containing (meth)acryloxy monomers, siloxane-containing vinyloxycarbonyloxy monomers, siloxane-containing vinyloxycarbonylamino monomers, siloxane-containing vinylaminocarbonylamino monomers, or siloxane-containing vinylaminocarbonyloxy monomers, each of which comprises a bis(trialkylsilyloxy)alkylsilyl group, a tris(trialkylsilyloxy)-silyl group, or a polysiloxane chain having 2 to 30 siloxane units and terminated with an alkyl, hydroxyalkyl or methoxyalkyl group. Such preferred siloxane-containing vinylic monomers can be obtained from the commercial suppliers, or alternatively prepared according to known procedures, e.g., similar to those described in U.S. Pat. Nos. 5,070,215, 6,166,236, 6,867,245, 7,214,809, 8,415,405, 8,475,529, 8,614,261, 8,658,748, 9,097,840, 9,103,965, 9,217,813, 9,315,669, and 9,475,827, or by reacting a vinylic monomer having a reactive functional group (e.g., an acid chloride, acid anhydride, carboxyl, hydroxyl, amino, epoxy, isocyanate, aziridine, azlactone, or aldehyde group) with a siloxane-containing compound having a reactive group selected from the group consisting of a hydroxyalkyl, an aminoalkyl, an alkylaminoalkyl, a carboxyalkyl, an isocyanatoalkyl, an epoxyalkyl, and an aziridinylalkyl, in the presence or absence of a coupling agent under coupling reaction conditions well known to a person skilled in the art.

Any thermal polymerization initiators can be used in the invention. Suitable thermal polymerization initiators are known to the skilled artisan and comprise, for example peroxides, hydroperoxides, azo-bis(alkyl- or cycloalkylnitriles), persulfates, percarbonates, or mixtures thereof. Examples of preferred thermal polymerization initiators include without limitation benzoyl peroxide, t-butyl peroxide, t-amyl peroxybenzoate, 2,2-bis(tert-butylperoxy)butane, 1,1-bis(tert-butylperoxy)cyclohexane, 2,5-Bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, di-t-butyl-diperoxyphthalate, t-butyl hydro-peroxide, t-butyl peracetate, t-butyl peroxybenzoate, t-butylperoxy isopropyl carbonate, acetyl peroxide, lauroyl peroxide, decanoyl peroxide, dicetyl peroxydicarbonate, di(4-t-butylcyclohexyl) peroxy dicarbonate (Perkadox 16S), di(2-ethylhexyl)peroxy dicarbonate, t-butylperoxy pivalate (Lupersol 11); t-butylperoxy-2-ethylhexanoate (Trigonox 21-C50), 2,4-pentanedione peroxide, dicumyl peroxide, peracetic acid, potassium persulfate, sodium persulfate, ammonium persulfate, 2,2'-azobis(4-methoxy-2,4-dimethylvaleronitrile) (VAZO 33), 2,2'-Azobis[2-(2-imidazolin-2-yl)propane]dihydrochloride (VAZO 44), 2,2'-azobis(2-amidinopropane) dihydrochloride (VAZO 50), 2,2'-azobis(2,4-dimethylvaleronitrile) (VAZO 52), 2,2'-azobis(isobutyronitrile) (VAZO 64 or AIBN), 2,2'-azobis-2-methylbutyronitrile (VAZO 67), 1,1-azobis(1-cyclohexanecarbonitrile) (VAZO 88); 2,2'-azobis (2-cyclopropylpropionitrile), 2,2'-azobis(methylisobutyrate), 4,4'-Azobis(4-cyanovaleric acid), and combinations thereof. Preferably, the thermal initiator is 2,2'-azobis(isobutyronitrile) (AIBN or VAZO 64).

Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®, Germanium-based Norrish Type I photoinitiators (e.g., those described in U.S. Pat. No. 7,605,190). Examples of benzoylphosphine initiators include 2,4,6-trimethylbenzoyldiphenylphosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329.

Any hydrophobic non-silicone vinylic monomers can be in this invention. Examples of preferred hydrophobic non-silicone vinylic monomers include $C_1$-$C_{10}$ alkyl (meth) acrylate (e.g., methyl (meth)acrylate, ethyl (meth)acrylate, propyl (meth)acrylate, isopropyl (meth)acrylate, 2-ethylhexyl (meth)acrylate, etc.), cyclohexyl (meth)acrylate, vinyl acetate, vinyl propionate, vinyl butyrate, vinyl valerate, styrene, chloroprene, vinyl chloride, vinylidene chloride, (meth)acrylonitrile, 1-butene, butadiene, vinyl toluene, vinyl ethyl ether, perfluorohexylethyl-thio-carbonyl-aminoethyl-methacrylate, isobornyl (meth)acrylate, trifluoroethyl (meth)acrylate, hexafluoro-isopropyl (meth)acrylate, hexafluorobutyl (meth)acrylate, and combinations thereof.

Examples of preferred polymerizable dyes include without limitation 1,4-bis(4-(2-methacryloxyethyl)phenylamino) anthraquinone (Reactive Blue 246), 1,4-bis((2-hydroxyethyl)amino)-9,10-anthracenedione-bis(2-propenoic)ester (Reactive Blue 247).

Preferred examples of UV-absorbing vinylic monomers of formula (1) include without limitation 2-(2'-hydroxy-5'-vinylphenyl)-2H-benzotriazole, 2-(2'-hydroxy-5'-methacryloxyphenyl)-2H-benzotriazole, 2-(2'-hydroxy-5'-acryloyloxyphenyl)-2H-benzotriazole, 2-[2'-hydroxy-5'-(2-methacryloxyethyl)phenyl)]-2H-benzotriazole (Norbloc), 2-[2'-hydroxy-5'-(2-acryloxyethyl)-phenyl)]-2H-benzotriazole, 2-(2'-hydroxy-5'-methacryloxypropylphenyl)-2H-benzotriazole, 2-(2'-hydroxy-5'-acryloxypropylphenyl)-2H-benzotriazole.

Benzotriazole-containing UV-absorbing vinyl monomers can be prepared according to procedures described in U.S. Pat. Nos. 3,299,173, 4,612,358, 4,716,234, 4,528,311, 10,254,567 or can be obtained from commercial suppliers. Examples of preferred UV/HEVL-absorbing vinylic monomers of formula (2) include without limitation: 2-(2'-hydroxy-3'-methacrylamidomethyl-5'-tert-octylphenyl)-2H-benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-hydroxy-5-methoxy-3-(5-(trifluoromethyl)-2H-benzo[d][1,2,3]triazol-2-yl)benzyl methacrylate (WL-1), 2-hydroxy-5-methoxy-3-(5-methoxy-2H-benzo[d][1,2,3]triazol-2-yl)benzyl methacrylate (WL-5), 3-(5-fluoro-2H-benzo[d][1,2,3]triazol-2-yl)-2-hydroxy-5-methoxybenzyl methacrylate (WL-2), 3-(2H-benzo[d][1,2,3]triazol-2-yl)-2-hydroxy-5-methoxybenzyl methacrylate (WL-3), 3-(5-chloro-2H-benzo[d][1,2,3]triazol-2-yl)-2-hydroxy-5-methoxybenzyl methacrylate (WL-4), 2-hydroxy-5-methoxy-3-(5-methyl-2H-benzo[d][1,2,3]triazol-2-yl) benzyl methacrylate (WL-6), 2-hydroxy-5-methyl-3-(5-(trifluoromethyl)-2H-benzo[d][1,2,3]triazol-2-yl)benzyl methacrylate (WL-7), 4-allyl-2-(5-chloro-2H-benzo[d][1,2,3]triazol-2-yl)-6-methoxyphenol (WL-8), 2-{2'-Hydroxy-3'-tert-butyl-5'-[3"-(4"-vinylbenzyloxy)propoxy]phenyl}-5-methoxy-2H-benzotriazole, 2-(5-chloro-2H-benzotriazol-2-yl)-6-(1,1-dimethylethyl)-4-ethenyl-phenol (UVAM), 2-{2'-Hydroxy-3'-tert-butyl-5'-[3'-methacryloyloxypropoxy]phenyl}-2H-benzotriazole, 2-{2'-Hydroxy-3'-tert-butyl-5'-[3'-methacryloyloxypropoxy]phenyl}-5-methoxy-2H-benzotriazole (UV13), 2-{2'-Hydroxy-3'-tert-butyl-5'-[3'-methacryloyloxypropoxy]phenyl}-5-chloro-2H-benzotriazole (UV28), 2-[2'-Hydroxy-3'-tert-butyl-5'-(3'-acryloyloxypropoxy)phenyl]-5-trifluoromethyl-2H-benzotriazole (UV23), 2-(2'-hydroxy-5'-methacrylamidophenyl)-5-methoxybenzotriazole (UV6), 2-(3-allyl-2-hydroxy-5-methylphenyl)-2H-benzotriazole (UV9), 2-(2-Hydroxy-3-methallyl-5-methylphenyl)-2H-benzotriazole (UV12), 2-[3'-t-butyl-2'-hydroxy-5'-(3"-dimethylvinylsilylpropoxy)-2'-hydroxyphenyl)]-5-methoxybenzotriazole (UV15), 2-(2'-hydroxy-5'-methacryloylpropyl-3'-tert-butyl-phenyl)-5-methoxy-2H-benzotriazole (UV16), 2-(2'-hydroxy-5'-acryloylpropyl-3'-tert-butyl-phenyl)-5-methoxy-2H-benzotriazole (UV16A), 2-Methylacrylic acid 3-[3-tert-butyl-5-(5-chlorobenzotriazol-2-yl)-4-hydroxyphenyl]-propyl ester (16-100, CAS #96478-15-8), 2-(3-(tert-butyl)-4-hydroxy-5-(5-methoxy-2H-benzo[d][1,2,3]triazol-2-yl)phenoxy)ethyl methacrylate (16-102); 2-(5-chloro-2H-benzotriazol-2-yl)-6-methoxy-4-(2-propen-1-yl)-phenol (CAS #1260141-20-5); 2-[2-Hydroxy-5-[3-(methacryloyloxy)propyl]-3-tert-butylphenyl]-5-chloro-2H-benzotriazole; those benzotriazole-containing vinylic monomers disclosed in U.S. Pat. No. 10,254,567.

A SiHy contact lens formulation can also comprise other necessary components known to a person skilled in the art, such as, for example, antimicrobial agents (e.g., preferably silver nanoparticles), a bioactive agent, leachable lubricants (e.g., non-polymerizable hydrophilic polymers, etc.), leachable tear-stabilizing agents (e.g., phospholipids, monoglycerides, diglycerides, triglycerides, glycolipids, glyceroglycolipids, sphingolipids, sphingo-glycolipids, etc.), and mixtures thereof, as known to a person skilled in the art.

A polymerizable composition (SiHy lens formulation) can be a solventless clear liquid prepared by mixing all polymerizable components and other necessary component or a solution prepared by dissolving all the desirable components in any suitable solvent, such as, a mixture of water and one or more organic solvents miscible with water, an organic solvent, or a mixture of one or more organic solvents, as known to a person skilled in the art. The term "solvent" refers to a chemical that cannot participate in free-radical polymerization reaction.

A solventless lens SiHy lens formulation typically comprises at least one blending vinylic monomer as a reactive solvent for dissolving all other polymerizable components of the solventless SiHy lens formulation. Examples of preferred blending vinylic monomers are described later in this application. Preferably, methyl methacrylate is used as a blending vinylic monomer in preparing a solventless SiHy lens formulation.

Any solvents can be used in the invention. Example of preferred organic solvents includes without limitation, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-pyrrolidinone, N,N-dimethylpropionamide, dimethyl formamide, dimethyl acetamide, dimethyl propionamide, N-methyl pyrrolidinone, and mixtures thereof.

Numerous SiHy lens formulations have been described in numerous patents and patent applications published by the filing date of this application and have been used in producing commercial SiHy contact lenses. Examples of commercial SiHy contact lenses include, without limitation, asmofilcon A, balafilcon A, comfilcon A, delefilcon A, efrofilcon A, enfilcon A, fanfilcon A, galyfilcon A, lotrafilcon A, lotrafilcon B, narafilcon A, narafilcon B, senofilcon A, senofilcon B, senofilcon C, smafilcon A, somofilcon A, and stenfilcon A.

A SiHy lens formulation (i.e., polymerizable composition) can be cured (polymerized) thermally or actinically as known to a person skilled in the art, preferably in molds for cast molding of contact lenses.

The thermal polymerization is carried out conveniently, for example at a temperature of from 25 to 120° C. and preferably 40 to 100° C. The reaction time may vary within wide limits, but is conveniently, for example, from 1 to 24 hours or preferably from 2 to 12 hours. It is advantageous to previously degas the components and solvents used in the polymerization reaction and to carry out said copolymerization reaction under an inert atmosphere, for example under a nitrogen or argon atmosphere.

The actinic polymerization can then be triggered off by actinic radiation, for example light, in particular UV light or visible light of a suitable wavelength. The spectral requirements can be controlled accordingly, if appropriate, by addition of suitable photosensitizers.

In accordance with the invention, the silicone hydrogel material as the lens bulk material has an oxygen permeability of from about 50 (preferably about 60, more preferably about 70, even more preferably about 90 barrers, most preferably at least about 100 barrers) to about 180 barrers. The silicone hydrogel material can also have an equilibrium water content of from about 10% (preferably about 20%, more preferably 30%; even more preferably about 40%) to about 80% by weight. The silicone hydrogel material can further have a bulk elastic modulus (i.e., bulk Young Modulus) of from about 0.3 MPa to about 1.8 MPa, preferably from 0.4 MPa to about 1.5 MPa, more preferably from about 0.4 MPa to about 1.2 MPa. The oxygen permeability, elastic modulus and water content of the silicone hydrogel material of a contact lens of the invention can be determined by measuring the oxygen permeability, the elastic modulus and water content of the preformed contact lens. A person skilled in the art knows well how to determine the elastic modulus and equilibrium water content of a silicone hydrogel material or a SiHy contact lens. For example, all commercial SiHy contact lenses have reported values of oxygen permeability, elastic modulus and water content.

A preformed contact lens of the invention can be obtained according to any method known to a person skilled in the art or to be developed.

In accordance with the invention, a contact lens precursor is a preformed contact lens that either inherently comprises or has been subjected to at least one post-curing-surface-treatment to have carboxylic acid groups on and/or near its surface.

Where a preformed contact lens inherently comprises carboxylic acid groups on and/or near its surfaces, the contact lens precursor is composed of a lens bulk material that is obtained by polymerizing a polymerizable composition (i.e., a non-silicone hydrogel lens formulation or a silicone hydrogel lens formulation) comprising a vinylic monomer which further comprises at least one carboxylic acid group. Examples of carboxyl-containing vinylic monomers are known in the art and can be obtained from commercial sources or prepared according to known procedures. The lens formulation comprises preferably from about 0.1% to about 10%, more preferably from about 0.25% to about 7%, even more preferably from about 0.5% to about 5%, most preferably from about 0.75% to about 3%, by weight of such a carboxyl-containing vinylic monomer.

A preformed contact lens can also be subjected either to a surface treatment to have carboxylic acid groups on and/or near its surfaces. Any suitable surface treatments can be used in the invention. Examples of surface treatments include: without limitation, plasma treatments; chemical treatments; chemical vapor depositions; the grafting (covalently attaching) of compounds having at least one reactive functional groups onto the surface (modified or unmodified) of an article; the graft-polymerization of carboxyl-containing vinylic monomers onto the surface (modified or unmodified) of an article; layer-by-layer ("LbL") deposition of one or more polyanionic polymers (having carboxylic acid groups) on the surface (modified or unmodified) of a preformed contact lens (i.e., a process for forming an LbL coating); covalently attachment of one or more polyanionic polymers (having carboxylic acid groups) onto the surface (modified or unmodified) of a preformed contact lens; or combinations thereof.

A plasma treatment refers to a process in which a contact lens is exposed to a plasma to chemically modify the surface of the contact lens. The term "plasma" denotes an ionized gas (e.g., created by electric glow discharge which may be composed of electrons, ions of either polarity, gas atoms and molecules in the ground or any higher state of any form of excitation, as well as of photons). The excited species interact with solid surfaces of an article placed in the plasma, resulting in the chemical and physical modification of the material surface. Where a plasma is generated by subjecting a gas in a vacuum chamber to an electric charge typically at radio frequency (rf) (or at a microwave or other frequency), it is often called "low temperature plasma". Where a plasma is generated by an atmospheric discharge (e.g., arc discharge) and sustained at a surrounding atmospheric pressure, it is a "high temperature plasma" or "atmospheric plasma". An atmospheric plasma can be produced by atmospheric pressure discharges.

For a review of plasma treatment and its uses reference is made to R. Hartmann "Plasma polymerisation: Grundlagen, Technik and Anwendung, Jahrb. Oberflächentechnik (1993) 49, pp. 283-296, Battelle-Inst. e.V. Frankfurt/Main Germany; H. Yasuda, "Glow Discharge Polymerization", Journal of Polymer Science: Macromolecular Reviews, vol. 16 (1981), pp. 199-293; H. Yasuda, "Plasma Polymerization", Academic Press, Inc. (1985); Frank Jansen, "Plasma Deposition Processes", in "Plasma Deposited Thin Films", ed. by T. Mort and F. Jansen, CRC Press Boca Raton (19); O. Auciello et al. (ed.) "Plasma-Surface Interactions and Processing of Materials" publ. by Kluwer Academic Publishers in NATO ASI Series; Series E: Applied Sciences, vol. 176 (1990), pp. 377-399; and N. Dilsiz and G. Akovali "Plasma Polymerization of Selected Organic Compounds", Polymer, vol. 37 (1996) pp. 333-341.

The known plasma treatment under low pressure includes plasma deposition, plasma-induced polymerization, plasma grafting, plasma oxidation, and the likes. Plasma treatment under low pressure haven been used in commercial products, for example, such as, Focus NIGHT & DAY® and AIR OPTIX® (Alcon), and PUREVISION® (Bausch & Lomb). Advantages of a plasma coating, such as, e.g., those may be found with Focus NIGHT & DAY®, are its durability, relatively high hydrophilicity/wettability), and low susceptibility to lipid and protein deposition and adsorption. Examples of plasma treatment are those disclosed in U.S. Pat. Nos. 4,143,949; 4,312,575; 5,464,667; 6,881,269; and 7,078,074. It is understood that a preformed contact lenses must typically be dried before a plasma treatment under low pressure.

A person skilled in the art understand well that a plasma (i.e., electrical glow discharge plasma) is a partially ionized gas which consists of large concentrations of excited atomic, molecular, ionic, and free-radical species and which is generated subjecting a gas in a vacuum chamber to an electric field, typically at radio frequency (rf) (or at a microwave or other frequency).

As an illustrated example of plasma treatment under low pressure of silicone hydrogel contact lenses, one or more preformed silicone hydrogel contact lenses are placed in a reactor chamber between opposing electrodes. The chamber is then sealed and depressurized by a vacuum system. Significant time is required to pump the system to the operative pressure. When a suitable pressure is achieved in the chamber, a process gas is introduced into the chamber interior, and the electrodes are energized. The resulting plasma cloud may apply a thin layer of polymer (or a polymer coating) to the lens and/or change the chemical composition of a top layer of the lens surface depending upon the process gas used. After an appropriate time, the electrodes are de-energized, and the reactor chamber is brought back to atmospheric pressure so that the lenses may be removed.

Low pressure plasma treatment systems are known to a person skilled in the art and have been disclosed in patents and articles. For example, Peng Ho and Yasuda describe, in their paper ("Ultrathin Coating Of Plasma Polymer Of Methane Applied On The Surface Of Silicone Contact Lenses," Journal of Biomedical Materials Research, Vol. 22, 919-937 (1988)), a batch low-pressure-plasma treatment system (or a rotary plasma system) including a bell-shaped vacuum chamber in which opposing aluminum electrodes are disposed and a rotatable aluminum plate sits between the electrodes and is driven by an induction motor within the system. Matsuzawa and Winterton disclose in U.S. Pat. No. 6,881,269 a linear low-pressure-plasma system.

In accordance with the invention, the preformed contact lens in a dried state is treated with a low-pressure plasma generated in a plasma gas (i.e., an atmosphere) compose of air, $N_2$, $O_2$, $CO_2$, or a mixture of a $C_1$-$C_6$ hydrocarbon and a secondary gas selected from the group consisting of air, $N_2$, $O_2$, $CO_2$, and combinations thereof (preferably $CO_2$ or a mixture of a $C_1$-$C_4$ hydrocarbon and a secondary gas selected from the group consisting of air, $CO_2$, $N_2$, and combinations thereof, more preferably $CO_2$ or a mixture of methane and a secondary gas selected from the group consisting of air, $CO_2$, $N_2$, and combinations thereof, even more preferably $CO_2$ or a mixture of methane and $CO_2$).

Atmospheric plasma surface treatment disclosed in U.S. Pat. No. 9,156,213 is preferably used in the invention. For the atmospheric plasma surface treatment, contact lenses can be in a fully hydrated state.

A person skilled in the art knows well how to graft (covalently attach) a compound having at least one carboxylic acid group onto a surface of a contact lens according to known coupling reactions.

"LbL coating", as used herein, refers to a coating that is not covalently attached to the polymer matrix of a contact lens and is obtained through a layer-by-layer ("LbL") deposition of one or more polymeric materials on the lens. An LbL coating can be composed of one or more layers. LbL coatings on contact lenses can be obtained according to methods described in U.S. Pat. Nos. 6,451,871, 6,719,929, 6,793,973, 6,811,805, 6,896,926, 8,044,112, 8,158,192, and 8,147,897. Preferably, an LbL coating comprises at least one layer of one or more polyanionic polymers each comprising carboxylic acid groups. The polyanionic polymer is preferably a polyanionic polymer selected from the group consisting of polyacrylic acid, polymethacrylic acid, polyethylacrylic acid, poly(acrylic acid-co-methacrylic acid), poly(acrylic acid-co-ethacrylic acid), poly(methacrylic acid-co-ethacrylic acid), and a mixture thereof, more preferably a polyanionic polymer which is polyacrylic acid, polymethacrylic acid, poly(acrylic acid-co-methacrylic acid), or a mixture thereof.

An LbL coating of a polyanionic polymer having carboxylic acid groups can be form on a contact lens by contacting the contact lens with a solution of the polymer. Contacting of a contact lens with a coating solution of a polymer can occur by dipping it into the coating solution or by spraying it with the coating solution. One contacting process involves solely dipping the contact lens in a bath of a coating solution for a period of time or alternatively dipping the contact lens sequentially in a series of bath of coating solutions for a fixed shorter time period for each bath. Another contacting process involves solely spray a coating solution. However, a number of alternatives involve various combinations of spraying- and dipping-steps may be designed by a person having ordinary skill in the art. The contacting time of a contact lens with a coating solution of a reactive polymer may last up to about 10 minutes, preferably from about 5 to about 360 seconds, more preferably from about 5 to about 250 seconds, even more preferably from about 5 to about 200 seconds.

A solution of a polyanionic polymer for forming a coating on contact lenses can be prepared by dissolving one or more polymers in water, a mixture of water and an organic solvent miscible with water, an organic solvent, or a mixture of one or more organic solvent. Preferably, the polymer is dissolved in a mixture of water and one or more organic solvents, an organic solvent, or a mixture of one or more organic solvent. It is believed that a solvent system containing at least one organic solvent can swell a contact lens so that a portion of the polyanionic polymer may penetrate into the contact lens and increase the durability of the coating. Examples of organic solvents are described above. The pH of the polyanionic polymer solution is preferably from about 1.5 to about 4.0 to form a relatively-thick and stable LbL coating. The temperature of the coating solution is preferably from about 20° C. to about 70° C.

A person skilled in the art knows how to covalently attach one or more polymers having carboxylic acid groups onto the surface of a contact lens. Exemplary methods for covalently attaching one or more hydrophilic polymers onto a medical device are disclosed in U.S. Pat. Nos. 5,599,576, 5,766,158, 6,087,415, 6,096,726, 6,340,465, 6,440,571, 6,500,481, 6,534,559, 6,623,747, 6,683,062, 6,838,491, 6,866,936, 6,923,978, and 8,529,057 and in U.S. Pat. Appl. Pub. Nos. 2009-0145086A1, 2009-0145091A1, 2008-0142038A1, and 2007-0122540A1.

Graft-polymerization of one more vinylic monomers having at least one carboxylic acid group in the presence or absence of a vinylic crosslinking agent to form a hydrophilic polymer coating are described in numerous patents, for example, in U.S. Pat. Nos. 6,099,122, 6,436,481, 6,440,571, 6,447,920, 6,465,056, 6,521,352, 6,586,038, 6,730,366, 6,734,321, 6,835,410, and 6,878,399 and in JP2001075060. For example, a preformed contact lens in dry state is first subjected to a plasma treatment in a plasma atmosphere of a compound having at least one reactive carboxylic acid group to form a plasma coating having carboxylic acid groups. The plasma-treated contact lens is reacted with a compound having a free-radical initiator moiety (e.g., a thermal initiator or a photoinitiator) or preferably a living polymerization initiator moiety (e.g., an atom transfer radical polymerization (ATRP) initiator or a reversible addition fragmentation chain transfer polymerization (RAFT) initiator) and a functional group co-reactive with the functional groups of the plasma coating on the contact lens in the presence or absence of a coupling agent under coupling reaction conditions known to a person skilled in the art. The obtained contact lens with free-radical initiator moieties thereon is immersed in a solution of one or more vinylic monomers having at least one carboxylic acid group and subject to conditions to initiate free radical polymerization of those vinylic monomers so as to form a layer of a graft—from polymer comprising carboxylic acid groups.

In a preferred embodiment, the contact lens precursor comprises a lens bulk material and a layer of at least one polymeric material having carboxylic acid groups thereon. It is understood that the layer of at least one polymeric material having carboxylic acid groups can be covalently bound directly to the polymer matrix of the lens bulk material or non-covalently associated with the lens bulk material. Preferably, said at least one polymeric material having the carboxylic acid groups comprises polyacrylic acid, polymethacrylic acid, polyethylacrylic acid, poly(acrylic acid-co-methacrylic acid), poly(acrylic acid-co-ethacrylic acid), poly(methacrylic acid-co-ethacrylic acid), or a mixture thereof.

In accordance with the invention, said at least one hydrophilic copolymer comprises (a) monomeric units of at least one epoxy-containing vinylic monomer, preferably of formula of

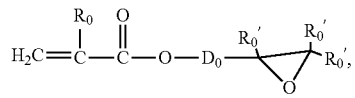

(b) monomeric units of at least one amino-containing acrylic monomer, preferably of formula of

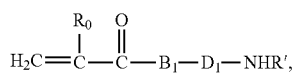

(c) monomeric units of at least one polyethyleneglycol-containing acrylic monomer, preferably of formula of

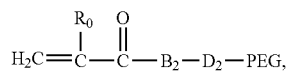

and (d) monomeric units of at least one phosphorylcholine-containing acrylic monomer, preferably of formula of

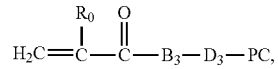

in which: each $R_0$ independent one another is H or $CH_3$; each $R_0'$ independent of one another is H or $C_1$-$C_4$ alkyl; $B_1$, $B_2$ and $B_3$ independent of one another are O or NR'; R' is H or $C_1$-$C_4$ alkyl; $D_1$, $D_2$ and $D_3$ independent of one another are a $C_1$-$C_{12}$ alkylene divalent radical; $D_0$ is a $C_1$-$C_{12}$ alkylene divalent radical or a divalent radical of -$D_4$-O-$D_5$-$B_4$—$CH_2$—; $B_4$ is —O— or

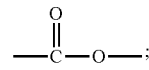

$D_4$ is a $C_1$-$C_{12}$ alkylene divalent radical; $D_5$ is a $C_2$-$C_6$ alkylene divalent radical or a divalent radical of

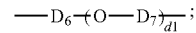

$D_6$ and $D_7$ independent of each other is a $C_2$-$C_6$ alkylene divalent radical; d1 is zero, 1 or 2; PEG is a polyethyleneglycol group of

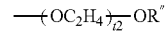

in which R" is H or $C_1$-$C_4$ alkyl; t2 is an integer from 3 to 100; PC is a zwitterionic group of

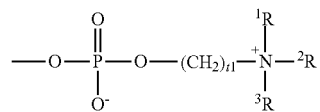

in which t1 is an integer of 1 to 5 and $^1R$, $^2R$ and $^3R$ independently of one another are $C_1$-$C_8$ alkyl or $C_1$-$C_8$ hydroxyalkyl.

In a preferred embodiment, said at least one hydrophilic copolymer is a statistical copolymer of formula (I)

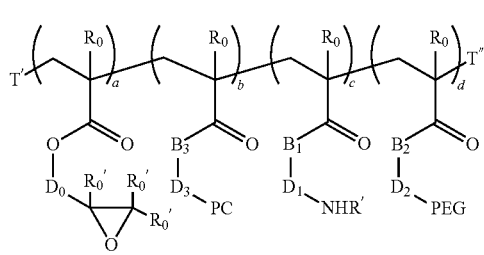

in which T' and T" independent of each other are H or a terminal group; each $R_0$ independent one another is H or $CH_3$; each $R_0'$ independent of one another is H or $C_1$-$C_4$ alkyl; $B_1$, $B_2$ and $B_3$ independent of one another are O or NR'; R' is H or $C_1$-$C_4$ alkyl; $D_1$, $D_2$ and $D_3$ independent of one another are a $C_1$-$C_{12}$ alkylene divalent radical; $D_0$ is a $C_1$-$C_{12}$ alkylene divalent radical or a divalent radical of -$D_4$-O-$D_5$-$B_4$—$CH_2$—; $B_4$ is —O— or

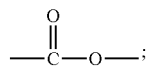

$D_4$ is a $C_1$-$C_{12}$ alkylene divalent radical; $D_5$ is a $C_2$-$C_6$ alkylene divalent radical or a divalent radical of

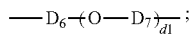

$D_6$ and $D_7$ independent of each other is a $C_2$-$C_6$ alkylene divalent radical; d1 is zero, 1 or 2; PEG is a polyethyleneglycol group of

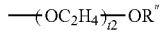

in which R" is H or $C_1$-$C_4$ alkyl; t2 is an integer from 3 to 100; PC is a zwitterionic group of

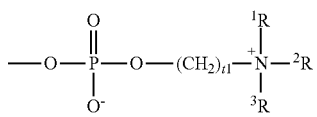

in which t1 is an integer of 1 to 5 and $^1R$, $^2R$ and $^3R$ independently of one another are $C_1$-$C_8$ alkyl or $C_1$-$C_8$ hydroxyalkyl; a, b, c, and d independent of one another are an integer if from 5 to 100, wherein $(a+c)/(a+b+c+d) \leq 0.40$ (preferably $\leq 0.35$, more preferably $\leq 0.30$, even more preferably $\leq 0.25$). Preferably, a/c is from 10 to 0.1 (preferably from 5 to 0.2, more preferably from 2.5 to 0.4, even more preferably from 2 to 0.5).

Any epoxy-containing vinylic monomers can be used in the invention. Example of epoxy-containing vinylic monomers includes without limitation 3,4-epoxy-1-butene, 1,2-epoxy-5-hexene, 2-methyl-2-vinyloxirane, glycidyl vinyl ether, glycidyl vinyloxyethyl ether, 2-(ethenoxymethyl)-3-methyloxirane, 2-(1-ethenoxypropan-2-yloxymethyl)oxirane, 2-[2-[2-(vinyloxy)ethoxy]ethoxymethyl]oxirane, 2-[2-[2-[2-(vinyloxy)ethoxy]ethoxy]ethoxymethyl]oxirane, 2-[2-[2-[2-(vinyloxy)ethoxy]ethoxy]ethoxy]ethoxymethyl] oxirane, 2-(3-ethenoxypropoxymethyl)oxirane, allyl glycidyl ether, 2-[2-(allyloxy)ethoxymethyl]oxirane, [2-[2-(allyloxy)ethoxy]-ethyl]glycidyl ether, 2-[2-[2-(2-prop-2-enoxyethoxy)ethoxy]ethoxymethyl]oxirane, 2-[3-(2-prop-2-enoxyethoxy)propoxymethyl]oxirane, 2-(3-prop-2-enoxypropoxymethyl)oxirane, 2-(but-3-en-2-yloxymethyl) oxirane, 2-methyl-3-(prop-2-enoxymethyl)oxirane, 2-(1-prop-2-enoxyethyl)oxirane, 2-[2-[2-[2-(2-prop-2-enoxyethoxy)ethoxy]ethoxy]ethoxymethyl]oxirane, and preferably epoxy-containing acrylic monomers.

Examples of preferred epoxy-containing acrylic monomers include without limitation glycidyl (meth)acrylate, 2-methylglycidyl (meth)acrylate, 2-[2-(oxiran-2-ylmethoxy)ethoxy]ethyl (meth)acrylate, (3-methyloxiran-2-yl)methyl (meth)acrylate, 2-[2-(oxiran-2-ylmethoxy) propoxy]propyl (meth)acrylate, 2-[2-(oxiran-2-ylmethoxy) propoxy]ethyl (meth)acrylate, 2-[2-(oxiran-2-ylmethoxy) ethoxy]propyl (meth)acrylate, 2-(oxiran-2-yl)propan-2-yl (meth)acrylate, 2-[2-(oxiran-2-ylmethoxy)ethoxy]propyl (meth)acrylate, 1-(2-methyloxiran-2-yl)ethyl (meth)acrylate, (2,3-dimethyloxiran-2-yl)methyl (meth)acrylate, (3-ethyloxiran-2-yl)methyl (meth)acrylate, 3-(oxiran-2-ylmethoxy)butyl (meth)acrylate, 2-(oxiran-2-ylmethoxy)propyl (meth)acrylate, 1-(oxiran-2-yl)propyl (meth)acrylate, (3,3-dimethyloxiran-2-yl)methyl (meth)acrylate, 3-(oxiran-2-ylmethoxy) propyl (meth)acrylate, [3-(oxiran-2-ylmethoxy)-3-oxopropyl](meth)acrylate.

Any amino-containing vinylic monomers can be used in the present invention. Examples of amino-containing vinylic monomers include without limitation vinylamine, allylamine, N-allylmethylamine, N-allyl-N-ethylamine, 3-butenylamine, 3-(vinyloxy)propylamine, 3-ethenoxy-2-methylpropan-1-amine, 1-ethenoxypropan-1-amine, 1-ethenoxy-2-methylpropan-1-amine, 3-ethenoxy-2,2-dimethylpropan-1-amine, 1-ethenoxypropane-1,3-diamine, [2-(vinyloxy) ethyl]-amine, 3-(prop-2-en-1-yloxy)propan-1-amine, 1-prop-2-enoxypropan-2-amine, 2-prop-2-enoxyethanamine, 2-methyl-3-prop-2-enoxypropan-1-amine, 2-(2-prop-2-enoxyethoxy)-ethanamine, 2-[2-(2-prop-2-enoxyethoxy)ethoxy]ethanamine, 2-[2-(2-prop-2-enoxyethoxy)-ethoxy]ethoxy]ethanamine, 2-[2-[2-(2-prop-2-enoxyethoxy)ethoxy]ethoxy]ethanamine, 3-methoxy-2-prop-2-enoxypropan-1-amine, and preferably amino-containing acrylic monomers.

Examples of preferred amino-containing acrylic monomers include without limitation N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth) acrylate, 3-amino-2-hydroxypropyl (meth)acrylate, trimethylammonium 2-hydroxy propyl (meth)acrylate hydrochloride, dimethylaminoethyl (meth)acrylate Any polyethyleneglycol-containing vinylic monomers can be used in the present invention. Examples of polyethyleneglycol-containing vinylic monomers include without limitation tri(ethylene glycol) monovinyl ether, tetra(ethylene glycol) monovinyl ether, poly(ethylene glycol) monovinyl ether, tri(ethylene glycol) methyl vinyl ether, tetra(ethylene glycol) methyl vinyl ether, poly(ethylene glycol) methyl vinyl ether, tri(ethylene glycol) monoallyl ether, tetra(ethylene glycol) monoallyl ether, poly(ethylene glycol) monoallyl ether, tri(ethylene glycol) methyl allyl ether, tetra(ethylene glycol) methyl allyl ether, poly(ethylene glycol) methyl allyl ether, and preferably polyethyleneglycol-containing acrylic monomers.

Examples of preferred polyethyleneglycol-containing acrylic monomers include without limitation tri(ethylene glycol) methyl ether (meth)acrylate, tetra(ethylene glycol) methyl ether (meth)acrylate, $C_1$-$C_4$-alkoxy poly(ethylene glycol) (meth)acrylate having a number average molecular weight of up to 1500, methoxy-poly(ethylene glycol)ethyl (meth)acrylamide having a number average molecular weight of up to 1500, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, Any phosphorylcholine-containing vinylic monomers can be used in the present invention. Examples of phosphorylcholine-containing vinylic monomers include without limitation 2-(vinyloxy)ethyl-2'-(trimethylammohlo)ethylphosphate, 2-(allyloxy)ethyl-2'-(trimethylammonio)-ethylphosphate, 2-(vinyloxycarbonyl)ethyl-2'-(trimethylammonio)ethyl phosphate, 2-(allyloxycarbonypethyl-2'-(trimethylammonio)-ethylphosphate, 2-(allyloxycarbonylamino)ethyl-2'-(trimethylammonio)ethyl phosphate, 2-(butenoyloxy)ethyl-2'-(trimethylammonio)ethylphosphate, and preferably phosphorylcholine-containing acrylic monomers.

Examples of preferred phosphorylcholine-containing acrylic monomers include without limitation (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]ethyl-2'-(trimethylammonio)ethylphosphate, 3-[(meth)acryloylamino]propyl-2'-(trimethylammonio)ethylphosphate, 4-[(meth)acryloylamino]butyl-2'-(trimethylammonio)ethylphosphate, 5-((meth)acryloyloxy)pentyl-2'-(trimethylammonio)ethyl phosphate, 6-((meth)acryloyloxy)hexyl-2'-(trimethylammonio)-ethylphosphate, 2-((meth)acryloyloxy)ethyl-2'-(triethylammonio)-ethylphosphate, 2-((meth)acryloyloxy)ethyl-2'-(tripropylammonio)ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)-ethylphosphate, 2-((meth)acryloyloxy)pentyl-2'-(trimethylammonio)ethylphosphate, 2-((meth)acryloyloxy)hexyl-2'-(trimethylammonio)ethyl phosphate.

A hydrophilic copolymer of the invention can be obtained by polymerizing a polymerizable composition comprising all the required vinylic monomers, free-radical initiator and optionally a chain-transfer agent (i.e., a thiol-containign compound), according to any procedures kown to a person skilled in the art.

In accordance with the invention, the contact lens precursor with the carboxylic acid groups thereon (i.e., the contact lens precursor) is heated in an aqueous solution which comprises a hydrophilic copolymer of the invention, at a temperature of from about 50° C. to about 140° C. for a time period to crosslink the hydrophilic copolymer of the invention while covalently attaching the crosslinked hydrophilic copolymer onto the preformed contact lens so as to form a hydrogel coating on the surface of the preformed contact lens.

Preferably, the step of heating is performed by autoclaving the contact lens precursor with the carboxylic acid groups thereon (i.e., the contact lens precursor) immersed in the aqueous solution which is a packaging solution (i.e., a buffered aqueous solution with a pH of from 6.7 to 7.6) in a sealed lens package at a temperature of from about 115° C. to about 125° C. for approximately 20-90 minutes. It is believed that during autoclave a tiny amount of epoxide (epoxy) groups which do not participate in crosslinking reaction may be hydrolyzed into 2,3-dihydroxypropyl (HO—$CH_2$—CH(OH)—$CH_2$—) groups and that the hydrophilic copolymer present in the lens packaging solution, if applicable, can be converted to a non-reactive polymeric wetting agent capable of improving a lens's insert comfort. Consequently, the packaging solution is ophthalmically safe after autoclave.

Lens packages (or containers) are well known to a person skilled in the art for autoclaving and storing a contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

In another preferred embodiment, the aqueous solution is a packaging solution for storing contact lenses each individually in a sealed and sterilized lens package, as well known to a person skilled in the art. In accordance with the invention, a packaging solution can contain one or more other ingredients known to a person skilled in the art. Examples of other ingredients include without limitation, one or more buffering agents for maintaining the pH of a packaging solution within a range from about 6.8 to about 7.5, preferably from about 6.8 to about 7.4, more preferably from about 6.9 to about 7.3), surfactants, antibacterial agents, preservatives, and lubricants (e.g., cellulose derivatives, polyvinyl alcohol, polyvinyl pyrrolidone).

Physiologically compatible buffering agents have been widely used in contact lens packaging solutions and contact lens care compositions. Examples of such buffering agents include without limitation boric acid, borates (e.g. sodium borate, potassium borate), citric acid, citrates (e.g., monopotassium citrate, monosodium citrate; dipotassium citrate; disodium citrate; tripotassium citrate), phosphates (e.g. $NaH_2PO_4$, $KH_2PO_4$, $Na_2HPO_4$, $K_2HPO_4$, $Na_3HPO_4$, $K_3HPO_4$), TRIS (i.e., 2-amino-2-hydroxymethyl-1,3-propanediol), Bis-Tris [i.e., Bis-(2-hydroxyethyl)-imino-tris-(hydroxymethyl)-methane], Bis-Tris propane [i.e., 1,3-bis (tris(hydroxymethyl)methylamino)propane], bis-aminopolyols, triethanolamine, ACES [i.e., N-(2-hydroxyethyl)-2-aminoethanesulfonic acid], BES [i.e., N,N-Bis(2-hydroxyethyl)-2-aminoethanesulfonic acid], HEPES [i.e., 4-(2-hydroxyethyl)-1-piperazineethanesulfonic acid], MES [i.e., 2-(N-morpholino)ethanesulfonic acid], MOPS [i.e., 3-[N-morpholino]-propanesulfonic acid], PIPES [i.e., piperazine-N,N'-bis(2-ethanesulfonic acid], TES {i.e., N-[Tris(hydroxymethyl)methyl]-2-aminoethanesulfonic acid}, salts thereof, or mixtures thereof. The total concentration of all buffering agents present in the aqueous solution is from about 10 mM to 100 mM (preferably from about 10 mM to 90 mM, more preferably from about 10 mM to about 80 mM, even more preferably from about 10 mM to 70 mM).

In a preferred embodiment, the aqueous solution additionally includes one or more tonicity-adjusting agents which independently of one another can be ionic or nonionic. Suitable occularly acceptable tonicity-adjusting agents include, but are not limited to sodium chloride, potassium chloride, glycerol, propylene glycol, polyols, mannitol, sorbitol, xylitol and mixtures thereof. Preferably, non-ionic tonicity-adjusting agents are used to adjust the osmolality of the aqueous solution to a value from about 200 to about 450 mOsm/Kg (preferably from about 230 to about 400 mOsm/Kg, more preferably from about 260 to about 350 mOsm/Kg).

Lenses are packaged in individual packages, sealed, and sterilized (e.g., by autoclave at about 120° C. or higher for at least 30 minutes under pressure) prior to dispensing to users. A person skilled in the art will understand well how to seal and sterilize lens packages.

The layered structure configuration of a contact lens of the invention can be established by analysis with atomic force microscopy (AFM) alone or in combination with a differential staining of the hydrogel coating or the lens bulk material, environmental scanning electron microscopy, confocal fluorescence microscopy, or any other known techniques of a cross section of a contact lens in fully hydrated state (i.e., directly in water or a buffered saline) as known to a person skilled in the art.

In accordance with the invention, a contact lens of the invention has at least one property selected from the group consisting of an equilibrium water content of from about 15% to about 70% (preferably from about 20% to about 65%, more preferably from about 20% to about 60%, even more preferably from about 25% to about 55%) by weight, an elastic modulus of from about 0.2 MPa to about 2.0 MPa (preferably from about 0.25 MPa to about 1.5 MPa, more preferably from about 0.3 MPa to about 1.2 MPa, even more preferably from about 0.35 MPa to about 1.0 MPa), an oxygen transmissibility of at least 40 barrers/mm (preferably at least 60 barrers/mm, more preferably at least 80 barrers/mm, even more preferably at least 100 barrers/mm), and an averaged water contact angle of less than 90 degrees (preferably less than 80 degrees, more preferably less than 70 degrees, even more preferably less than 60 degrees).

Although various embodiments of the invention have been described using specific terms, devices, and methods, such description is for illustrative purposes only. The words used are words of description rather than of limitation. As would be obvious to one skilled in the art, many variations and modifications of the invention may be made by those skilled in the art without departing from the spirit and scope of the novel concepts of the disclosure. In addition, it should be understood that aspects of the various embodiments of the invention may be interchanged either in whole or in part or can be combined in any manner and/or used together, as illustrated below:

1. A method for making coated contact lenses, comprising the steps of:
   (1) obtaining a contact lens precursor which has a concave surface and an opposite convex surface and comprises a lens bulk material and carboxylic acid groups on and/or near the anterior and posterior surfaces;
   (2) immersing the contact lens precursor in an aqueous solution in a container, wherein the aqueous solution comprises from about 0.01% to about 5.0% by weight of at least one hydrophilic copolymer that comprises (a) monomeric units of at least one epoxy-containing vinylic monomer, (b) monomeric units of at least one amino-containing vinylic monomer having a primary or secondary amino group, (c) monomeric units of at least one polyethyleneglycol-containing vinylic monomer, and (d) monomeric units of at least one phosphorylcholine-containing vinylic monomer, wherein the sum of the amounts of components (a) and (b) in said at least one hydrophilic copolymer is about 40% by mole or less; and
   (3) heating the aqueous solution with the contact lens precursor therein at a temperature of from about 100° C. to about 140° C. for at least 30 minutes to form a coated contact lens having a hydrogel coating thereon, wherein the hydrogel coating is covalently attached onto the anterior and posterior surfaces through linkages each formed between on carboxylic acid group and one epoxy group, wherein the hydrogel coating comprises a crosslinked polymeric material comprising polymer chains derived from the hydrophilic copolymer,
   wherein the contact lens has a water-break-up time (WBUT) of at least 10 seconds.
2. The method of embodiment 1, wherein the contact lens precursor is composed of a lens bulk material that has carboxylic acid groups on and/or near the surfaces of the lens bulk material.
3. The method of embodiment 2, wherein the lens bulk material is obtained by polymerizing a polymerizable composition comprising from about 0.1% to about 10% by weight of a vinylic monomer which further comprises at least one carboxylic acid group.
4. The method of embodiment 2, wherein the lens bulk material has been subjected to at least one post-curing surface treatment to have the carboxylic acid groups on and/or near the surfaces of the lens bulk material.
5. The method of any one of embodiments 1 to 4, wherein the contact lens precursor comprises a lens bulk material and a layer of at least one polymeric material having carboxylic acid groups thereon.
6. The method of embodiment 5, wherein said at least one polymeric material having the carboxylic acid groups comprises polyacrylic acid, polymethacrylic acid, polyethylacrylic acid, poly(acrylic acid-co-methacrylic acid), poly(acrylic acid-co-ethacrylic acid), poly(methacrylic acid-co-ethacrylic acid), or a mixture thereof.
7. The method of any one of embodiments 1 to 6, wherein the method comprises, before step (2), a step of contacting the contact lens precursor with a coating solution including at least one reactive polymer having pendant carboxylic acid groups to form a reactive base coating comprising a layer of said at least one reactive polymer.
8. The method of embodiment 7, wherein said at least one reactive polymer comprises a homo- or copolymer of acrylic acid or $C_1$-$C_3$ alkylacrylic acid.
9. The method of embodiment 8, wherein the homo- or copolymer of acrylic acid or $C_1$-$C_3$ alkylacrylic acid is polyacrylic acid, polymethacrylic acid, polyethylacrylic acid, polypropylacrlic acid, poly(acrylic acid-co-methacrylic acid), poly[(meth)acrylic acid-co-ethylacrylic acid], poly[(meth)acrylic acid-co-propylacrylic acid], poly[(meth)acrylic acid-co-acrylamide], poly[(meth)acrylic acid-co-vinylpyrrolidone], poly[ethylacrylic acid-co-acrylamide], poly[ethylacrylic acid-co-vinylpyrrolidone], poly[propylacrylic acid-co-acrylamide], poly[propylacrylic acid-co-vinylpyrrolidone], poly[(meth)acrylic acid-co-vinylacetate], hydrolyzed poly[ethylacrylic acid-co-vinylacetate], poly[propylacrylic acid-co-vinylacetate], or combinations thereof.
10. The method of any one of embodiments 7 to 9, wherein the coating solution has a pH of from about 1.5 to about 5.5.

11. The method of any one of embodiments 7 to 10, wherein the coating solution is prepared by dissolving said at least one reactive polymer in water, a mixture of water with one or more organic solvent, an organic solvent, or a mixture of one or more organic solvent and optionally by adding an inorganic acid or an organic acid to adjust pH of the coating solution.

12. The method of any one of embodiments 1 to 11, wherein the aqueous solution comprises from about 0.05% to about 4.0% by weight of said at least one hydrophilic copolymer.

13. The method of any one of embodiments 1 to 11, wherein the aqueous solution comprises from about 0.1% to about 3% by weight of said at least one hydrophilic copolymer.

14. The method of any one of embodiments 1 to 11, wherein the aqueous solution comprises from about 0.2% to about 2.5% by weight of said at least one hydrophilic copolymer.

15. The method of any one of embodiments 1 to 14, where the step of heating is performed by autoclaving the contact lens precursor with the carboxylic acid groups thereon immersed in the aqueous solution which is a packaging solution in a sealed lens package at a temperature of from about 115° C. to about 125° C. for approximately 30-90 minutes.

16. A contact lens, comprising: an anterior surface, an opposite posterior surface, and a layered structural configuration from the anterior surface to the posterior surface, wherein the layered structural configuration comprises an outer anterior surface hydrogel layer, an inner layer, and an outer posterior surface hydrogel layer, wherein the inner layer comprises a lens bulk material and has carboxylic acid groups on and/or near the surfaces of the inner layer, wherein the outer anterior surface hydrogel layer and the outer posterior surface hydrogel layer comprise a crosslinked polymeric material comprising polymer chains derived from a hydrophilic copolymer that comprises (a) monomeric units of at least one epoxy-containing vinylic monomer, (b) monomeric units of at least one amino-containing vinylic monomer having a primary or secondary amino group, (c) monomeric units of at least one polyethyleneglycol-containing vinylic monomer, and (d) monomeric units of at least one phosphorylcholine-containing vinylic monomer, wherein the sum of the amounts of components (a) and (b) in said at least one hydrophilic copolymer is about 40% by mole or less, wherein the outer anterior surface hydrogel layer and the outer posterior surface hydrogel layer are covalently attached onto the inner layer through linkages each formed between one carboxylic acid group and one epoxy group, wherein the contact lens has a water-break-up time (WBUT) of at least 10 seconds.

17. The contact lens of embodiment 16, wherein the inner layer is composed of a lens bulk material that has carboxylic acid groups on and/or near the surfaces of the bulk material.

18. The contact lens of embodiment 16, wherein the inner layer comprises a lens bulk material and a layer of at least one polymeric material having carboxylic acid groups.

19. The method of any one of embodiments 1 to 15 or the contact lens of any one of embodiments 16 to 18, wherein said at least one hydrophilic copolymer comprises:

(a) monomeric units of at least one epoxy-containing vinylic monomer of formula of

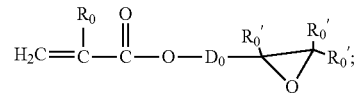

(b) monomeric units of at least one amino-containing acrylic monomer of formula of

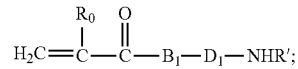

(c) monomeric units of at least one polyethyleneglycol-containing acrylic monomer of formula of

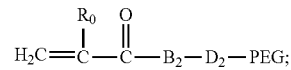

and (d) monomeric units of at least one phosphorylcholine-containing acrylic monomer of formula of

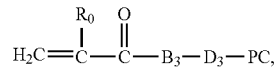

in which:
each $R_0$ independent one another is H or $CH_3$; each $R_0'$ independent of one another is H or $C_1$-$C_4$ alkyl; $B_1$, $B_2$ and $B_3$ independent of one another are O or NR'; R' is H or $C_1$-$C_4$ alkyl; $D_1$, $D_2$ and $D_3$ independent of one another are a $C_1$-$C_{12}$ alkylene divalent radical; $D_0$ is a $C_1$-$C_{12}$ alkylene divalent radical or a divalent radical of -$D_4$-O-$D_5$-$B_4$—$CH_2$—; $B_4$ is —O— or

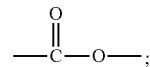

$D_4$ is a $C_1$-$C_{12}$ alkylene divalent radical; $D_5$ is a $C_2$-$C_6$ alkylene divalent radical or a divalent radical of

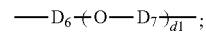

$D_6$ and $D_7$ independent of each other is a $C_2$-$C_6$ alkylene divalent radical; d1 is zero, 1 or 2; PEG is a polyethyleneglycol group of

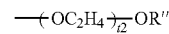

in which R" is H or $C_1$-$C_4$ alkyl; t2 is an integer from 3 to 100; PC is a zwitterionic group of

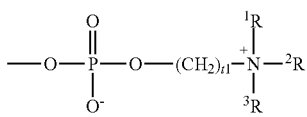

in which t1 is an integer of 1 to 5 and $^1R$, $^2R$ and $^3R$ independently of one another are $C_1$-$C_8$ alkyl or $C_1$-$C_8$ hydroxyalkyl.

20. The method of any one of embodiments 1 to 15 or the contact lens of any one of embodiments 16 to 18, wherein said at least one hydrophilic copolymer is a statistical copolymer of formula (I)

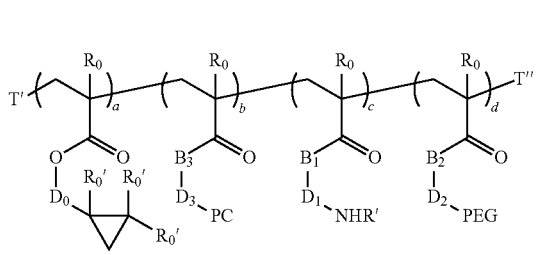

in which

T' and T" independent of each other are H or a terminal group; each $R_0$ independent one another is H or $CH_3$; each $R_0'$ independent of one another is H or $C_1$-$C_4$ alkyl; $B_1$, $B_2$ and $B_3$ independent of one another are O or NR'; R' is H or $C_1$-$C_4$ alkyl; $D_1$, $D_2$ and $D_3$ independent of one another are a $C_1$-$C_{12}$ alkylene divalent radical; $D_0$ is a $C_1$-$C_{12}$ alkylene divalent radical or a divalent radical of -$D_4$-O-$D_5$-$B_4$—$CH_2$—; $B_4$ is —O— or

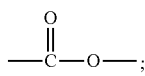

$D_4$ is a $C_1$-$C_{12}$ alkylene divalent radical; $D_5$ is a $C_2$-$C_6$ alkylene divalent radical or a divalent radical of

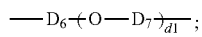

$D_6$ and $D_7$ independent of each other is a $C_2$-$C_6$ alkylene divalent radical; d1 is zero, 1 or 2; PEG is a polyethyleneglycol group of

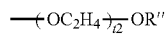

in which R" is H or $C_1$-$C_4$ alkyl; t2 is an integer from 3 to 100; PC is a zwitterionic group of

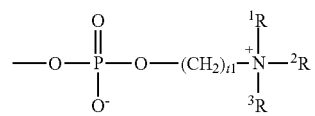

n which t1 is an integer of 1 to 5 and $^1R$, $^2R$ and $^3R$ independently of one another are $C_1$-$C_8$ alkyl or $C_1$-$C_8$ hydroxyalkyl; a, b, c, and d independent of one another are an integer if from 5 to 100, wherein (a+c)/(a+b+c+d)≤0.40 (preferably ≤0.35, more preferably ≤0.30, even more preferably ≤0.25).

21. The method or contact lens of embodiment 20, wherein in formula (I), a/c is from 10 to 0.1.

22. The method or contact lens of embodiment 20, wherein in formula (I), a/c is from 5 to 0.2.

23. The method or contact lens of embodiment 20, wherein in formula (I), a/c is from 2.5 to 0.4.

24. The method or contact lens of embodiment 20, wherein in formula (I), a/c is from 2 to 0.5.

25. The method of any one of embodiments 1 to 15 and 19 to 24 or the contact lens of any one of embodiments 16 to 24, wherein the sum of the amounts of components (a) and (b) in said at least one hydrophilic copolymer is about 35% by mole or less.

26. The method of any one of embodiments 1 to 15 and 19 to 24 or the contact lens of any one of embodiments 16 to 24, wherein the sum of the amounts of components (a) and (b) in said at least one hydrophilic copolymer is about 30% by mole or less.

27. The method of any one of embodiments 1 to 15 and 19 to 24 or the contact lens of any one of embodiments 16 to 24, wherein the sum of the amounts of components (a) and (b) in said at least one hydrophilic copolymer is about 25% by mole or less.

28. The method of any one of embodiments 1 to 15 and 19 to 27 or the contact lens of any one of embodiments 16 to 27, wherein the lens bulk material is a hard plastic material.

29. The method or contact lens of embodiment 28, wherein the hard plastic material is a crosslinked polymethacrylate.

30. The method of any one of embodiments 1 to 15 and 19 to 27 or the contact lens of any one of embodiments 16 to 27, wherein the lens bulk material is a rigid gas permeable lens material.

31. The method of any one of embodiments 1 to 15 and 19 to 27 or the contact lens of any one of embodiments 16 to 27, wherein the lens bulk material consists essentially of a central optical zone that is essentially made of a gas permeable lens material and a peripheral zone that is essentially made of a non-silicone hydrogel material having an equilibrium water content of from about 10% to 80% by weight.

32. The method of any one of embodiments 1 to 15 and 19 to 27 or the contact lens of any one of embodiments 16 to 27, wherein the lens bulk material consists essentially of a 3-dimensional article and a non-silicone hydrogel material, wherein the 3-dimensional article is made of a non-hydrogel material and has a 3-dimensional size smaller than that of the contact lens so that the 3-dimensional article is completely embedded within the non-silicone hydrogel material having an equilibrium water content of from about 10% to 80% by weight.

33. The method of any one of embodiments 1 to 15 and 19 to 27 or the contact lens of any one of embodiments 16 to 27, wherein the lens bulk material is a non-silicone hydrogel material having an equilibrium water content of from about 10% to 80% by weight.

34. The method or contact lens of any one of embodiments 31 to 33, wherein the non-silicon hydrogel material comprises at least 50% by mole of repeating units of at least one hydroxyl-containing vinylic monomer.

35. The method or contact lens of embodiment 34, wherein said at least one hydroxyl-containing vinylic monomer is selected from the group consisting of hydroxyethyl (meth)acrylate, glycerol (meth)acrylate, 3-hydroxypropyl (meth)acrylate, 2-hydroxypropyl (meth)acrylate, 3-amino-2-hydroxypropyl (meth)acrylate, N-2-hydroxyethyl (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, vinyl alcohol, allyl alcohol, and combinations thereof.

36. The method or contact lens of embodiment 34, wherein said at least one hydroxyl-containing vinylic monomer is selected from the group consisting of hydroxyethyl (meth)acrylate, glycerol (meth)acrylate, and vinyl alcohol.

37. The method of any one of embodiments 1 to 15 and 19 to 27 or contact lens of any one of embodiments 31 to 36, werein the lens bulk material is a silicone hydrogel material.

38. The method of any one of embodiments 1 to 15 and 19 to 27 or the contact lens according to any one of embodiments 16 to 27, wherein the lens bulk material consists essentially of a central optical zone that is essentially made of a rigid gas permeable lens material and surrounded by a peripheral zone that is essential made of a silicone hydrogel material.

39. The method of any one of embodiments 1 to 15 and 19 to 27 or the coated contact lens according to any one of embodiments 16 to 27, wherein the lens bulk material consists essentially of a 3-dimensional article and a silicone hydrogel material, wherein the 3-dimensional article is made of a non-hydrogel material and has a 3-dimensional size smaller than that of the preformed embedded contact lens so that the 3-dimensional article is completely embedded within the silicone hydrogel material.

40. The method or contact lens of any one of embodiments 37 to 39, wherein the silicone hydrogel material comprises repeating units of at least one hydrophilic vinylic monomer, repeating units of at least one siloxane-containing vinylic monomer, and repeating units of at least one vinylic crosslinker.

41. The method or contact lens of embodiment 40, wherein said at least one hydrophilic vinylic monomer comprises: (1) an alkyl (meth)acrylamide selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof; (2) a hydroxyl-containing acrylic monomer selected from the group consisting of N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate, di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol) ethyl (meth)acrylamide having a number average molecular weight of up to 1500, and combinations thereof; (3) a carboxyl-containing acrylic monomer selected from the group consisting of 2-(meth)acrylamidoglycolic acid, (meth)acrylic acid, ethylacrylic acid, 3-(meth)acrylamidopropionic acid, 5-(meth)acrylamidopentanoic acid, 4-(meth)acrylamidobutanoic acid, 3-(meth)acrylamido-2-methylbutanoic acid, 3-(meth)acrylamido-3-methylbutanoic acid, 2-(meth)acrylamido-2methyl-3,3-dimethyl butanoic acid, 3-(meth)acrylamidohaxanoic acid, 4-(meth)acrylamido-3,3-dimethylhexanoic acid, and combinations thereof; (4) an amino-containing acrylic monomer selected from the group consisting of N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, and combinations thereof; (5) an N-vinyl amide monomer selected from the group consisting of N-vinylpyrrolidone, N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone, N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam, N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof; (6) a methylene-containing pyrrolidone monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof; (7) an acrylic monomer having a $C_1$-$C_4$ alkoxyethoxy group and selected from the group consisting of ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a number average molecular weight of up to 1500, methoxy-poly(ethylene glycol)ethyl (meth)acrylamide having a number average molecular weight of up to 1500, and combinations thereof; (8) a vinyl ether monomer selected from the group consisting of ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof; (9) an allyl ether monomer selected from the group consisting of ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof; (10) a phosphorylcholine-containing vinylic monomer selected from the group consisting of (meth)acryloxyethyl phosphorylcholine, (meth)acryloyloxypropyl phosphorylcholine, 4-((meth)acryloxy)-butyl-2'-(trimethylammonio)ethylphosphate, 2-[(meth)acryloylamino]ethyl-2'-(trimethyl-ammonio)ethylphosphate, 3-[(meth)acryloylamino]propyl-2'-(trimethylammonio)-ethylphosphate, 4-[(meth)acryloylamino]butyl-2'-(trimethylammonio)ethylphosphate, 5-((meth)acryloxy)pentyl-2'-(trimethylammonio)ethyl phosphate, 6-((meth)acryloyloxy)hexyl-2'-(trimethylammonio)ethylphosphate, 2-((meth)acryloxy)ethyl-2'-(triethylammonio)-ethylphosphate, 2-((meth)acryloyloxy)ethyl-2'-(tripropylammonio)ethylphosphate, 2-((meth)acryloxy)ethyl-2'-(tributylammonio)ethyl phosphate, 2-((meth)acryloyloxy)propyl-2'-(trimethylammonio)ethylphosphate, 2-((meth)acryloxy)butyl-2'-(trimethylammonio)-ethylphosphate, 2-((meth)acryloxy)pentyl-2'-(trimethylammonio)ethylphosphate, 2-((meth)acryloxy)hexyl-2'-(trimethylammonio)ethyl phosphate, 2-(vinyloxy)ethyl-2'-(trimethylammonio)ethylphosphate, 2-(allyloxy)ethyl-2'-(trimethylammonio)ethylphosphate, 2-(vinyloxycarbonypethyl-2'-(trimethylammonio)ethyl phosphate, 2-(allyloxycarbonyl)ethyl-2'-(trimethylammonio)-ethylphosphate, 2-(vinylcarbonylamino)ethyl-2'-(trimethylammonio)-ethylphosphate, 2-(allyloxycarbonylamino)ethyl-2'-(trimethylammonio)ethyl phosphate, 2-(butenoyloxy)ethyl-2'-(trimethylammonio)ethylphosphate, and combinations thereof; (11) allyl alcohol; (12) N-2-hydroxyethyl vinyl carbamate; (13) N-carboxyvinyl-β-alanine; (14) N-carboxyvinyl-α-alanine; (15) or combinations thereof.

42. The method or contact lens of embodiment 40 or 41, wherein said at least one siloxane-containing vinylic monomer is selected from the group consisting of α-(meth)acryloxypropyl terminated ω-$C_1$-$C_4$-alkyl terminated polydimethylsiloxane, α-(meth)acryloxy-2-hydroxypropyloxypropyl terminated ω-$C_1$-$C_4$-alkyl terminated polydimethylsiloxane, α-(2-hydroxyl-methacryloxypropyloxypropyl)-ω-$C_1$-$C_4$-alkyl-decamethylpentasiloxane, α-[3-(meth)acryloxyethoxy-2-hydroxypropyloxypropyl]-terminated ω-$C_1$-$C_4$-alkyl terminated polydimethylsiloxane, α-[3-(meth)acryloxy-propyloxy-2-hydroxypropyloxypropyl]-terminated ω-$C_1$-$C_4$-alkyl terminated polydimethylsiloxane, α-[3-(meth)acryloxy-isopropyloxy-2-hydroxypropyloxypropylperminated ω-$C_1$-$C_4$-alkyl terminated polydimethylsiloxane, α-[3-(meth)acryloxybutyloxy-2-hydroxypropyloxypropyl]-perminated ω-$C_1$-$C_4$-alkyl terminated polydimethylsiloxane, α-[3-(meth)acryloxyethylamino-2-hydroxypropyloxypropyl]-terminated ω-$C_1$-$C_4$-alkyl terminated polydimethylsiloxane, α-[3-(meth)acryloxypropylamino-2-hydroxypropyloxypropylperminated ω-$C_1$-$C_4$-alkyl terminated polydimethylsiloxane, α-[3-(meth)acryloxy-butylamino-2-hydroxypropyloxypropyl]-terminated ω-$C_1$-$C_4$-alkyl terminated polydimethylsiloxane, α-(meth)acryloxy(polyethylenoxy)-2-hydroxypropyloxypropylperminated ω-$C_1$-$C_4$-alkyl terminated polydimethylsiloxane, α-[(meth)acryloxy-2-hydroxypropyloxy-ethoxypropyl]-terminated ω-$C_1$-$C_4$-alkyl terminated polydimethylsiloxane, α-(meth)acryloxy-2-hydroxypropyl-N-ethylaminopropyl]-terminated ω-$C_1$-$C_4$-alkyl terminated polydimethylsiloxane, α-[(meth)acryloxy-2-hydroxypropyl-aminopropyl]-terminated ω-$C_1$-$C_4$-alkyl terminated polydimethylsiloxane, α-(meth)acryloxy-2-hydroxypropyloxy-(polyethylenoxy)propyl]-terminated ω-$C_1$-$C_4$-alkyl terminated polydimethylsiloxane, α-(meth)acryloylamidopropyloxypropyl terminated ω-$C_1$-$C_4$-alkyl terminated polydimethylsiloxane, α-N-methyl-(meth)acryloylamidopropyloxypropyl terminated ω-$C_1$-$C_4$-alkyl terminated polydimethylsiloxane, α-[3-(meth)acrylamidoethoxy-2-hydroxypropyloxypropyl]-terminated ω-$C_1$-$C_4$-alkyl polydimethylsiloxane, α-[3-(meth)acrylamidopropyloxy-2-hydroxypropyloxypropyl]-terminated ω-$C_1$-$C_4$-alkyl terminated polydimethylsiloxane, α-[3-(meth)acrylamidoisopropyloxy-2-hydroxypropyloxypropy]-terminated ω-$C_1$-$C_4$-alkyl terminated polydimethylsiloxane, α-[3-(meth)acrylamidobutyloxy-2-hydroxypropyloxypropyl]-terminated ω-$C_1$-$C_4$-alkyl terminated polydimethylsiloxane, α-[3-(meth)acryloylamido-2-hydroxypropyloxypropyl] terminated ω-$C_1$-$C_4$-alkyl polydimethylsiloxane, α-[3-[N-methyl-(meth)acryloylamido]-2-hydroxypropyloxypropyl] terminated ω-$C_1$-$C_4$-alkyl terminated polydimethylsiloxane, N-methyl-N'-(propyltetra(dimethylsiloxy)dimethylbutylsilane) (meth)acrylamide, N-(2,3-dihydroxypropane)-N'-(propyltetra(dimethylsiloxy)dimethylbutylsilane) (meth)acrylamide, (meth)acryloylamidopropyltetra(dimethylsiloxy)dimethylbutylsilane, α-vinyl carbonate-terminated ω-$C_1$-$C_4$-alkyl-terminated polydimethylsiloxanes, α-vinyl carbamate-terminated ω-$C_1$-$C_4$-alkyl-terminated polydimethylsiloxane, and a mixture thereof.

43. The method or contact lens of embodiment 40 or 41, wherein said at least one siloxane-containing vinylic monomer is selected from the group consisting of a vinylic monomer having a bis(trialkylsilyloxy)alkylsilyl group, a vinylic monomer having a tris(trialkylsilyloxy)-silyl group, a polysiloxane vinylic monomer, 3-methacryloxy propylpentamethyldisiloxane, t-butyldimethyl-siloxyethyl vinyl carbonate, tri methylsilylethyl vinyl carbonate, and trimethylsilylmethyl vinyl carbonate, and combinations thereof.

44. The method or contact lens of embodiment 40 or 41, wherein said at least one siloxane-containing vinylic monomer comprises at least one vinylic monomer of formula (M1) or (M2)

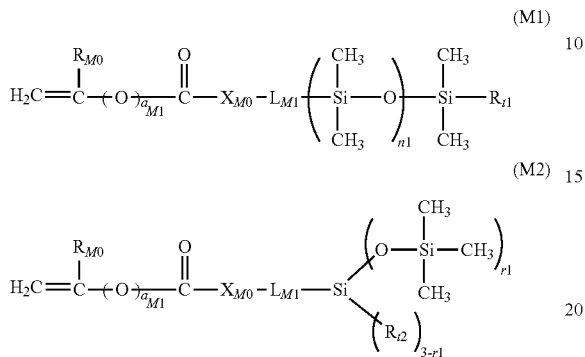

in which: $a_{M1}$ is zero or 1; $R_{M0}$ is H or methyl; $X_{M0}$ is O or $NR_{M1}$; $L_{M1}$ is a $C_2$-$C_8$ alkylene divalent radical or a divalent radical of $-L_{M1}'-X_{M1}-L_{M1}''-$,

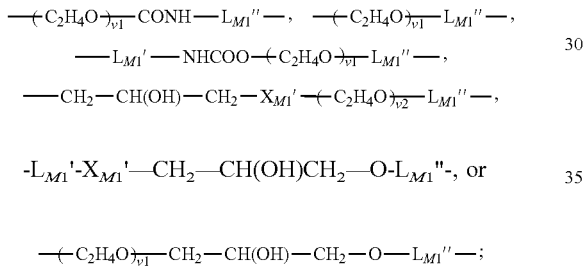

$-L_{M1}'-X_{M1}'-CH_2-CH(OH)CH_2-O-L_{M1}''-$, or $-(C_2H_4O)_{v1}-CH_2-CH(OH)-CH_2-O-L_{M1}''-$;

$L_{M1}'$ is a $C_2$-$C_8$ alkylene divalent radical which has zero or one hydroxyl group; $L_{M1}''$ is a $C_3$-$C_8$ alkylene divalent radical which has zero or one hydroxyl group; $X_{M1}$ is O, $NR_{M1}$, NHCOO, OCONH, $CONR_{M1}$, or $NR_{M1}CO$; $R_{M1}$ is H or a $C_1$-$C_4$ alkyl having 0 to 2 hydroxyl group; $R_{t1}$ and $R_{t2}$ independent of each other are a $C_1$-$C_6$ alkyl; $X_{M1}'$ is O or $NR_{M1}$; v1 is an integer of 1 to 30; m2 is an integer of 0 to 30; n1 is an integer of 3 to 40; and r1 is 2 or 3.

45. The method or contact lens of embodiment 40 or 41, wherein said at least one siloxane-containing vinylic monomer comprises tris(trimethylsilyloxy)silylpropyl (meth)acrylate, [3-(meth)acryloxy-2-hydroxypropyloxy]propylbis(trimethylsiloxy)methylsilane, [3-(meth)acryloxy-2-hydroxypropyloxy]propylbis(trimethylsiloxy)butylsilane, 3-(meth)acryloxy-2-(2-hydroxyethoxy)-propyloxy)propylbis(trimethylsiloxy) methylsilane, 3-(meth)acryloxy-2-hydroxypropyloxy) propyltris(trimethylsiloxy)silane, N-[tris (trimethylsiloxy)silylpropyl](meth)acrylamide, N-(2-hydroxy-3-(3-(bis(trimethylsilyloxy)methylsilyl) propyloxy)propyl)-2-methyl (meth)acrylamide, N-(2-hydroxy-3-(3-(bis(trimethylsilyloxy)methylsilyl) propyloxy)propyl) (meth)acrylamide, N-(2-hydroxy-3-(3-(tris(trimethylsilyloxy)silyl)propyloxy)propyl)-2-methyl acrylamide, N-(2-hydroxy-3-(3-(tris (trimethylsilyloxy)silyl)propyloxy)propyl) (meth) acrylamide, N-[tris(dimethylpropylsiloxy)silylpropyl]-(meth)acrylamide, N-[tris(dimethylphenylsiloxy)-silylpropyl] (meth)acrylamide, N-[tris (dimethylethylsiloxy)silylpropyl] (meth)acrylamide, N,N-bis[2-hydroxy-3-(3-(bis(trimethylsilyloxy)methylsilyl)propyloxy)propyl]-2-methyl (meth)acrylamide, N,N-bis[2-hydroxy-3-(3-(bis(trimethylsilyloxy)methylsilyl)propyloxy)propyl] (meth)acrylamide, N,N-bis [2-hydroxy-3-(3-(tris(trimethylsilyloxy)silyl)propyloxy)-propyl]-2-methyl (meth)acrylamide, N,N-bis[2-hydroxy-3-(3-(tris(trimethylsilyloxy)silyl)-propyloxy) propyl] (meth)acrylamide, N-[2-hydroxy-3-(3-(t-butyldimethylsilyl) propyloxy)-propyl]-2-methyl (meth)acrylamide, N-[2-hydroxy-3-(3-(t-butyldimethylsilyl)propyloxy)-propyl] (meth)acrylamide, N,N-bis [2-hydroxy-3-(3-(t-butyldimethylsilyl)propyloxy)-propyl]-2-methyl (meth)acrylamide, N-2-(meth) acryloxyethyl-O-(methyl-bis-trimethylsiloxy-3-propyl)silylcarbamate, 3-(trimethylsilyl)propylvinyl carbonate, 3-(vinyloxycarbonylthio)-propyl-tris(trimethyl-siloxy)silane, 3-[tris(trimethylsiloxy)silyl]propylvinyl carbamate, 3-[tris(trimethylsiloxy)silyl] propyl allyl carbamate, 3-[tris(trimethylsiloxy)silyl]propyl vinyl carbonate, or a combination thereof.

46. The method or contact lens of any one of embodiments 40 to 45, wherein said at least one vinylic crosslinker comprises at least one polysiloxane vinylic crosslinker.

47. The method or contact lens of embodiment 46, wherein said at least one polysiloxane vinylic crosslinker comprises a di-(meth)acryloyloxy-terminated polysiloxane vinylic crosslinker having dimethylsiloxane units and hydrophilized siloxane units each having one methyl substituent and one monovalent $C_4$-$C_{40}$ organic radical substituent having 2 to 6 hydroxyl groups.

48. The method or contact lens of embodiment 46, wherein said at least one polysiloxane vinylic crosslinker comprises at least one hydrophilized polysiloxane vinylic crosslinker of formula (G)

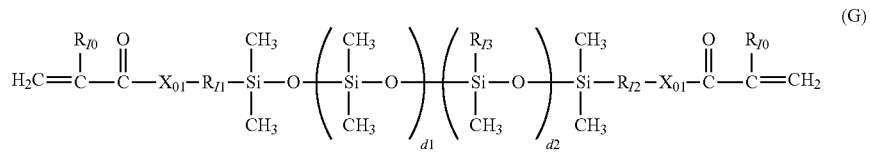

in which:
d1 is an integer of from 30 to 500 and d2 is an integer of from 1 to 75, provided that
d2/d1 is from about 0.035 to about 0.15;
$X_{01}$ is O or $NR_{IN}$ in which $R_{IN}$ is hydrogen or $C_1$-$C_{10}$-alkyl;

$R_{I0}$ is hydrogen or methyl;

$R_{I1}$ and $R_{I2}$ independently of each other are a substituted or unsubstituted $C_1$-$C_{10}$ alkylene divalent radical or a divalent radical of —$R_{I4}$—O—$R_{I5}$— in which $R_{I4}$ and $R_{I5}$ independently of each other are a substituted or unsubstituted $C_1$-$C_{10}$ alkylene divalent radical;

$R_{I3}$ is a monovalent radical of any one of formula (G-1) to (G-5)

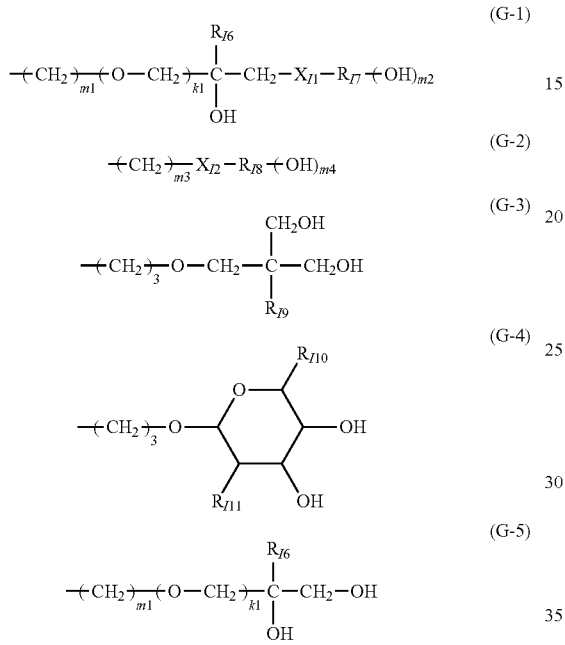

k1 is zero or 1; m1 is an integer of 2 to 4; m2 is an integer of 1 to 5; m3 is an integer of 3 to 6; m4 is an integer of 2 to 5;

$R_{I6}$ is hydrogen or methyl;

$R_{I7}$ is a $C_2$-$C_6$ hydrocarbon radical having (m2+1) valencies;

$R_{I8}$ is a $C_2$-$C_6$ hydrocarbon radical having (m4+1) valencies;

$R_{I9}$ is ethyl or hydroxymethyl;

$R_{I10}$ is methyl or hydromethyl;

$R_{I11}$ is hydroxyl or methoxy;

$X_{I1}$ is a sulfur linkage of —S— or a teriary amino linkage of —$NR_{I12}$— in which $R_{I12}$ is $C_1$-$C_1$ alkyl, hydroxyethyl, hydroxypropyl, or 2,3-dihydroxypropyl; and $X_{I2}$ is an amide linkage of

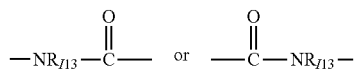

in which $R_{I13}$ is hydrogen or $C_1$-$C_{10}$ alkyl.

49. The method or contact lens of embodiment 46, wherein said at least one polysiloxane vinylic crosslinker comprises: (i) a vinylic crosslinker which comprises one sole polydiorganosiloxane segment and two terminal ethylenically-unsaturated groups selected from the group consisting of (meth)acryloyloxy groups, (meth)acryloylamino groups, vinyl carbonate groups, vinylcarbamate groups; and/or (ii) a chain-extended polysiloxane vinylic crosslinker which comprises at least two polydiorganosiloxane segment and a covalent linker between each pair of polydiorganosiloxane segments and two two terminal ethylenically-unsaturated groups selected from the group consisting of (meth)acryloyloxy groups, (meth)acryloylamino groups, vinyl carbonate groups, vinylcarbamate groups.

50. The method or contact lens of embodiment 46, wherein said at least one polysiloxane vinylic crosslinker comprises α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxyethoxy-2-hydroxypropyloxypropyl]-terminated polydimethylsiloxane, α,ω-bis[3-(meth)acryloxypropyloxy-2-hydroxypropyloxypropyl]-terminated polydimethylsiloxane, α,ω-bis[3-(meth)acryloxy-isopropyloxy-2-hydroxypropyloxypropyl]-terminated polydimethylsiloxane, α,ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxypropyl]-terminated polydimethylsiloxane, α,ω-bis[3-(meth)acrylamidopropyloxy-2-hydroxypropyloxypropyl]-terminated polydimethylsiloxane, α,ω-bis[3-(meth)acrylamido-isopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethylamino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxybutylamino-2-hydroxypropyloxypropyl]-terminated polydimethylsiloxane, α,ω-bis[(meth)acrylamidoethylamino-2-hydroxypropyloxypropyl]-terminated polydimethylsiloxane, α,ω-bis[3-(meth)acrylamido-propylamino-2-hydroxypropyloxypropyl]-terminated polydimethylsiloxane, α,ω-bis[3-(meth)acrylamide-butylamino-2-hydroxypropyloxypropyl]-terminated polydimethylsiloxane, α,ω-bisRmeth) acryloxy-2-hydroxypropyloxy-ethoxypropylperminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]polydimethylsiloxane, α,ω-bis[(meth)acryloxy-2-hydroxypropyloxy-(polyethylenoxy)propyl]-terminated polydimethylsiloxane, α,ω-bis[(meth)acryloxyethylaminocarbonyloxyethoxy-propyl]-terminated polydimethylsiloxane, α,ω-bis[(meth)acryloxyethylamino-carbonyloxy-(polyethylenoxy)propyl]-terminated polydimethylsiloxane, or combinations thereof.

51. The method of contact lens of any one of embodiments 40 to 50, wherein said at least one vinylic crosslinker comprises at least one non-silicone vinylic crosslinker.

52. The method or contact lens of embodiment 51, wherein said at least one non-silicone vinylic crosslinker comprises ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4- butanediol di-(meth)acrylate, glycerol 1,3-diglycerolate di-(meth)acrylate, ethylenebis[oxy(2-hydroxypropane-1,3-diyl)] di-(meth)acrylate, bis[2-(meth)acryloxyethyl] phosphate, trimethylolpropane di-(meth)acrylate, and 3,4-bis[(meth)acryloyl]tetrahydrofuan, diacrylamide, dimethacrylamide, N,N-di(meth)acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate, piperazine diacrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, allylmethacrylate, allylacrylate, N-allyl-methacrylamide, N-allyl-acrylamide, or combinations thereof.

53. The method or contact lens of any one of embodiments 40 to 52, wherein the silicone hydrogel comprises repeating units of at least one blending vinylic monomer.

54. The method or contact lens of embodiment 53, wherein said at least one blending vinylic monomer comprises $C_1$-$C_{10}$ alkyl (meth)acrylate, cyclopentylacrylate, cyclohexylmethacrylate, cyclohexylacrylate, isobornyl (meth)acrylate, styrene, 2,4,6-trimethylstyrene (TMS), t-butyl styrene (TBS), trifluoroethyl (meth)acrylate, hexafluoro-isopropyl (meth)acrylate, hexafluorobutyl (meth)acrylate, or combinations thereof.

55. The method or contact lens of embodiment 53, wherein said at least one blending vinylic monomer comprises methyl methacrylate.

56. The method or contact lens of any one of embodiments 40 to 55, wherein said at least one hydrophilic vinylic monomer comprises at least one hydrophilic N-vinyl amide monomer selected from the group consisting of N-vinylpyrrolidone, N-vinyl piperidone, N-vinyl caprolactam, N-vinyl-N-methyl acetamide, N-vinyl formamide, N-vinyl acetamide, N-vinyl isopropylamide, N-vinyl-N-methyl acetamide, N-vinyl-N-ethyl acetamide, N-vinyl-N-ethyl formamide, and mixtures thereof.

57. The method or contact lens of any one of embodiments 40 to 55, wherein said at least one hydrophilic vinylic monomer comprises N-vinylpyrrolidone and/or N-vinyl-N-methyl acetamide.

58. The method or contact lens of any one of embodiments 40 to 57, wherein said at least one hydrophilic vinylic monomer comprises a hydrophilic (meth)acrylamido monomer selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, poly(ethylene glycol)ethyl (meth)acrylamide having a number average molecular weight of up to 1500, 2-(meth)acrylamidoglycolic acid, 3-(meth)acrylamidopropionic acid, 5-(meth)acrylamidopentanoic acid, 4-(meth)acrylamidobutanoic acid, 3-(meth)acrylamido-2-methylbutanoic acid, 3-(meth)acrylamido-3-methylbutanoic acid, 2-(meth)acrylamido-2methyl-3,3-dimethyl butanoic acid, 3-(meth)acrylamidohaxanoic acid, 4-(meth)acrylamido-3,3-dimethylhexanoic acid, N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, methoxy-poly(ethylene glycol)ethyl (meth)acrylamide having a number average molecular weight of up to 1500, and combinations thereof.

59. The method or contact lens of any one of embodiments 40 to 57, wherein said at least one hydrophilic vinylic monomer comprises a hydrophilic (meth)acrylamido monomer selected from the group consisting of (meth)acrylamide, N,N-dimethyl (meth)acrylamide, N-ethyl (meth)acrylamide, N-propyl (meth)acrylamide, N-isopropyl (meth)acrylamide, N-3-methoxypropyl (meth)acrylamide, N-2-hydroxylethyl (meth)acrylamide, N-3-hydroxypropyl (meth)acrylamide, and combinations thereof.

60. The method or contact lens of any one of embodiments 40 to 59, wherein said at least one hydrophilic vinylic monomer comprises a hydroxy-containing vinylic monomer selected from the group consisting of hydroxyethyl (meth)acrylate, glycerol (meth)acrylate, 3-hydroxypropyl (meth)acrylate, 2-hydroxypropyl (meth)acrylate, 3-amino-2-hydroxypropyl (meth)acrylate, N-2-hydroxyethyl (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, vinyl alcohol, allyl alcohol, and combinations thereof.

61. The method or contact lens of any one of embodiments 40 to 60, wherein said at least one hydrophilic vinylic monomer comprises a methylene-containing pyrrolidone monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof.

62. The method or contact lens of any one of embodiments 40 to 61, wherein the silicone hydrogel comprises repeating units of at least one UV-absorbing vinylic monomer and optionally repeating units of at least one UV/HEVL-Absorbing vinylic monomer.

63. The method or contact lens of any one of embodiments 40 to 62, wherein the silicone hydrogel material has an equilibrium water content of from about 10% to about 80% by weight.

64. The method or contact lens of any one of embodiments 40 to 63, wherein the silicone hydrogel material has an oxygen permeability of from about 50 barrers to about 180 barrers.

65. The method or contact lens of any one of embodiments 40 to 63, wherein the silicone hydrogel material has an oxygen permeability of from about 60 barrers to about 180 barrers.
66. The method or contact lens of any one of embodiments 40 to 63, wherein the silicone hydrogel material has an oxygen permeability of from about 70 barrers to about 180 barrers.
67. The method or contact lens of any one of embodiments 40 to 63, wherein the silicone hydrogel material has an oxygen permeability of from about 80 barrers to about 180 barrers.
68. The method of any one of embodiments 1 to 15 and 19 to 67 or contact lens of any one of embodiments 16 to 67, wherein the contact lens has a water-break-up time of at least 12.5 seconds.
69. The method of any one of embodiments 1 to 15 and 19 to 67 or contact lens of any one of embodiments 16 to 67, wherein the contact lens has a water-break-up time of at least 15 seconds.
70. The method of any one of embodiments 1 to 15 and 19 to 67 or contact lens of any one of embodiments 16 to 67, wherein the contact lens has a water-break-up time of at least 17.5 seconds.
71. The method of any one of embodiments 1 to 15 and 19 to 67 or contact lens of any one of embodiments 16 to 67, wherein the contact lens has a water-break-up time of at least 20 seconds.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

Oxygen Permeability Measurements

Unless specified, the oxygen transmissibility (Dk/t), the intrinsic (or edge-corrected) oxygen permeability ($Dk_i$ or $Dk_c$) of a lens and a lens material are determined according to procedures described in ISO 18369-4.

Digital Rubbing Treatment

The lenses are digitally rubbed (wearing disposable powder-free latex gloves) with RENU® multi-purpose lens care solution (or another multi-purpose lens care solution) for 20 seconds and then rinsed with saline. The above procedure is repeated for i time (i.e., i cycles of digital rubbing) that imitates daily cleaning in a i-days lens care regime, e.g. 7 times (i.e., 7 cycles of digital rubbing) that imitates daily cleaning and disinfecting in a 7-days lens care regime), or 30 times (i.e., 30 cycles of digital rubbing) that imitates daily cleaning and disinfecting in a 30-days lens care regime.

Lubricity Evaluation

The lubricity of a contact lens is evaluated by using a finger-felt lubricity test which characterizes qualitatively the slipperiness of a lens surface on a friction rating scale of from 0 to 4. The higher the friction rating is, the lower the slipperiness (or lubricity).

Commercial lenses: DAILIES® TOTAL1®; ACUVUE® OASYS™; ACUVUE® ADVANCE PLUS™; DAILIES® Aqua Comfort Plus®; and AIR OPTIX®, are assigned a friction rating (designated "FR" hereinafter) of 0, 1, 2, 3, and 4 respectively. They are used as standard lenses for determining the friction rating of a lens under test.

The samples are placed in PBS for at least two rinses of 30 minutes each and then transferred to fresh PBS before the evaluation. Before the evaluation, hands are rinsed with a soap solution, extensively rinsed with DI water and then dried with KimVVipee towels. The samples are handled between the fingers and a numerical number is assigned for each sample relative to the above standard lenses described above. For example, if lenses are determined to be only slightly better than AIR OPTIX® lenses, then they are assigned a number 3. The value of a friction rating is one obtained by averaging the results of at least two friction ratings of a contact lens by two or more persons and/or by averaging the friction ratings of two or more contact lenses (from the identical batch of lens production) by one person.

The finger lubricities (i.e., friction ratings) of a contact lens can be determined either directly out-of-pack (OOP) but after 30 min soaking in PBS) or after i cycles (e.g., 7, 14, 21, or 30 cycles) of digital rubbing treatment, or after simulated abrasion cycling treatment according to the procedures described above.

Surface Wettability Tests

Water contact angle (WCA) on a contact lens is a general measure of the surface wettability of a contact lens. In particular, a low water contact angle corresponds to more wettable surface. Average contact angles (Sessile Drop) of contact lenses are measured using a VCA 2500 XE contact angle measurement device from AST, Inc., located in Boston, Massachusetts. This equipment is capable of measuring advancing contact angles ($\theta_a$) or receding contact angles ($\theta_r$) or sessile (static) contact angles. Unless specified, water contact angle is sessile (static) contact angle on the anterior surface of a contact lens. The measurements are performed on fully hydrated contact lenses and immediately after blot-drying. The blot-dried lens is then mounted on the contact angle measurement pedestal with the anterior surface up, and the sessile drop contact angle is automatically measured using the software provided by the manufacturer. The deionized water (ultra pure) used for measuring the water contact angle has a resistivity>18 MΩcm and the droplet volume used is 2 µl. The tweezers and the pedestal are washed well with Isopropanol and rinsed with DI (deionized) water before coming in contact with the contact lenses. Each static water contact angle is the average of the left and right water contact angles. The static water contact angle in reference to a contact lens is an average water contact angle obtained by averaging the static water contact angles measured with at least 5 contact lenses.

Water Break-up Time (WBUT) Tests

The surface hydrophilicity of lenses (after autoclave) is assessed by determining the time required for the water film to start breaking on the lens surface. Lenses exhibiting WBUT≥10 seconds are considered to have a hydrophilic surface and are expected to exhibit adequate wettability (ability to support the tear film) on-eye.

Lenses are prepared for water breakup measurement by removing the lens from its blister with soft plastic tweezers (Menicon) and placing the lens in a beaker containing phosphate buffered saline. The beaker contains at least 20 mL phosphate buffered saline per lens, with up to 3 lenses per beaker. Lenses are soaked for a minimum 30 minutes up to 24 hours before being transferred with soft plastic tweezers into a 96 well plastic tray with fresh phosphate buffered saline.

Water breakup time (WBUT) is measured at room temperature as follows: lenses are picked up with soft plastic tweezers as close to the edge of the lens as possible, base curve toward the measurer, taking care that the lens does not touch the sides of the well after being removed from the saline. The lens under test is shaken once to remove excess saline and a timer is started. Ideally, the water film in the base curve surface of the lens will recede from the point of contact with the tweezers's tips in a uniform, circular pattern. When approximately 30% of the hydrated area has receded, the timer is stopped and this time is recorded as the water breakup time (WBUT). Lenses that do not display the ideal receding pattern can be placed back in the tray and re-measured, after rehydrating for at least 30 seconds.

Equilibrium Water Content

The equilibrium water content (EWC) of contact lenses is determined as follows.

Amount of water (expressed as percent by weight) present in a hydrated hydrogel contact lens, which is fully equilibrated in saline solution, is determined at room temperature using an analytical balance. Remove the lenses from the saline, quickly blot with a cloth, stack and then transfer them to an aluminum pan with a prerecorded weight. The number of lenses for each sample pan is typically five (5). Record the pan plus hydrated weight of the lenses. Cover the pan with aluminum foil. Place pans in a laboratory oven at 100±2° C. to dry for 16-18 hours. Remove pan plus lenses from the oven and cool in a desiccator for at least 30 minutes. Remove the pan from the desiccator, and discard the aluminum foil. Weigh the pan plus dried lens sample on the analytical balance. The wet and dry weight of the lens samples can be calculated by subtracting the weight of the empty weigh pan, and the EWC is calculated from the weight lost divided by the number of lenses.

Elastic Modulus

The elastic modulus of a contact lens is determined using a MTS insight instrument. The contact lens is first cut into a 3.12 mm wide strip using Precision Concept two stage cutter. Five thickness values are measured within 6.5 mm gauge length. The strip is mounted on the instrument grips and submerged in PBS with the temperature controlled at 21±2° C. Typically a 5N Load cell is used for the test. The grips separate at a constant speed until the sample breaks. Force and displacement data are collected by the TestWorks software. The elastic modulus value is calculated by the TestWorks software which is the slope or tangent of the stress vs. strain curve near zero elongation, in the elastic deformation region.

Low pH Staining Test

The intactness of a hydrogel coating on a contact lens can be determined according to a Nile Red Staining Test Nile-red stock solution is prepared by dissolving 25 mg of Nile-red dye in 250 mL of 1-propanol. The Nile-red stock solution is diluted with n-heptane by a ratio of 1 to 20 to prepare Nile-red solution.

A contact lens to be tested is first immersed in an aqueous HCl solution (0.1 N) for 30 seconds, then is removed from the HCl solution and immersed in a Nile Red solution for 2 seconds, and finally is removed from the Nile Red solution and immersed in USP purified water while being agitated for 30 to 60 seconds to rinse off excess Nile Red solution. The Nile Red solution (12.5 µg/mL) in n-heptane is prepared by diluting 250 µL of a Nile Red stock solution (250 µg/mL) in 1-propanol with 4750 µL of n-heptane.

Remove lens from blister. Gently tap the lens on a blotting cloth to remove excess saline retained on the lens. Place the lens into 0.1N HCl (aq.) solution for 30 seconds. Remove lens and tap lens gently on a blotting cloth to remove excess HCl solution. Place into a Nile-red solution for 2 seconds. Remove lens and tap lens gently on a blotting cloth to remove excess Nile-red solution. Place lens into D.I. water for at least 30 seconds to rinse off excess Nile-red solution. Fill the lens sample holder with D.I. water and place the lens into the holder. Add additional D.I. water on top of the lens. Place a cover glass over the water meniscus. Place the lens sample holder into the sample chamber.

The contact lens is illuminated with a blue light at 470 nm wavelength to stimulate the fluorescence. The Nile-red dye attaches itself to hydrophobic areas on the lens surface. The less emitted red light from the lens, the less Nile-red dye, the better the hydrophilic coating. The image of the fluorescence is recorded by a camera with a filter that blocks the excitation light and only allows light to pass to the fluorescence wavelength. As a result, areas with an incomplete hydrogel coating appear bright orange in the fluorescence image. The observsation of no staining at all, small spot with light orange color, or few small spots or small areas with low intense orange color indicates "pass" of the test (i.e., intactness of the hydrogel coating on a contact lens). The observations of total staining with intense orange color, large areas and spots with light intense orange color even while having more black area than oranges areas, large areas and spots with intense orange color while having equal black and orange areas, or large areas and spots with intense orange color while having black areas less than the orange areas indicate "fail" of the test (i.e., the hydrogel coating is not intact on the contact lens).

As controls, a silicone hydrogel contact lens without any coating and a silicone hydrogel contact lens with a base coating (a layer of polyacrylic acid or polymethacrylic acid) are also tested. Because these contact lenses in the control experiments are free of a hydrogel coating thereon, Nile Red can penetrate into the bulk silicone hydrogel materials of the contact lenses. They will fail the Nile Red staining test.

Chemicals

The following abbreviations are used in the following examples: MPC represents 2-methacryloyloxyethyl phosphorylcholine; PEGMA300 represents polyethylene glycol methacrylate having a number average molecular weight of 300; APMAm represents N-(3-aminopropyl) methacrylamide; GMA represents glycidyl methacrylate; DMA represents N,N-dimethylacrylamide; CE-PDMS represents a polysiloxane vinylic crosslinker (Mw~11-12 KDa determined by $H^1$ NMR spectroscopy) which has three polydimethylsiloxane (PDMS) segments linked via diurethane linkages between two PDMS segments and two urethane linkages each located between one terminal methacrylate group and one PDMS segment and is prepared according to method similar to what described in Example 2 of U.S. Pat. No. 9,315,669; TRIS-Am represents N-[tris(trimethylsiloxy)-silylpropyl]acrylamide; Vazo-56 represents 2,2'-azobis(2-amidinopropane) dihydrochloride; Vazo-64 represents 2,2'-dimethyl-2,2'azodipropiononitrile; Norbloc is 2-[2'-hydroxy-5'-(2-methacryloxyethyl)phenyl)]-2H-benzotriazole; UV28 is 2-(3'-tert-butyl-2'-hydroxy-5'-(3"-methacryloyloxypropoxy) phenyl)-5-chloro-2H-benzotriazole; PAA represents polyacrylic acid; poly(AA-co-Am) (10/90) represents a copolymer of acrylaic acid (AA, 10 mole %) and acrylamide (Am, 90 mole %); PAE represents polyamidoamine-epicholohydrin; DI represents deionized water; EtOH represents ethanol; PrOH represents 1-propanol; MEK represents methyl ethyl keton; PBS represents a phosphate-buffered saline which has a pH of 7.2±0.2 at 25° C. and contains about 0.044 wt. % $NaH_2PO_4 \cdot H_2O$, about 0.388 wt. % $Na_2HPO_4 \cdot 2H_2O$, and about 0.79 wt. % NaCl; and wt. % represents weight percent.

Example 2

Preparation of Hydrophilic Copolymers

Dissolve 20.19 g of MPC and 20.24 g of PEGMA300 in 100 mL of water. Dissolve 5.01 g of APMAm into 25 mL of DI water. Dissolve 5.023 g of GMA into 75 mL of DI water and 45 g of EtOH. Dissolve 0.1342 g of Vazo-56 in 5 mL of DI water. Add all the solutions prepared above into a 1 L jacketed reactor. Rinse containers with 200 mL of DI water and add rinse water to the reactor. Purge solution with nitrogen for 10-12 minutes at a flow rate of about 100 mL/minute. After purging is complete, continue with a nitrogen blanket at a flow rate of about 50 mL/minute throughout the polymerization. Ramp solution temperature from room temperature to 53° C. over 2 hours, hold this temperature for 10 hours. Purify by ultrafiltration (10 kDa) to remove residual monomer using 4 bed volumes.

Gelation Studies

In order to demonstrate self-crosslinking capabilities, the hydrophilic copolymer prepared above (containing both epoxy groups and primary amino groups) is concentrated to 6.6% solids in water by rotovap. The pH measured is 6.5. The sample is divided into a control and 2 experimental samples (A and B). Sample A has a pH 6.5 (original pH) and sample B is pH to be be about 8.5 by adding 3N NaOH. Both samples A and B are autoclaved for 45 minutes. The results are reported in Table 1. The increase in viscosity indicates the inter- and intra-molecular crosslinking of the hydrophilic copolymer.

TABLE 1

|  | Control | Sample A | Sample B |
| --- | --- | --- | --- |
| pH | 6.5 | 6.5 | 8.5 |
| Autoclave (45 min. & 121° C.) | no | yes | yes |
| Viscosity (cps) | 113 | 132 | 181 |
| Comment |  |  | Partial gel |

A second gel study is performed. A 5 wt % aqueous solution of PAA ($M_w$ 450 KD) after adjustment to pH 7 is mixed with a 5 wt % aqueous solution of the hydrophilic copolymer prepared after adjustment to pH 7. After mixing the solution, gelling occurs immediately. A section of the formed gel is removed and put into an excess of water. The gel does not dissolve. This result shows the intermolecular crosslinking and intramolecular of PAA and the hydrophilic copolymer.

Example 3

Preparation of Phosphate Buffered Saline

A phosphate buffered saline is prepared by dissolving 0.044 wt % $NaH_2PO_4 \cdot H_2O$, 0.388 wt % $Na_2HPO_4 \cdot 2H_2O$, and 0.79% NaCl in DI water.

Preparation of 0.44% PAA Solution

Dissolve 0.88 g of poly(acrylic acid) (PAA, $M_w$~450 KD) into 191.66 g of 1-propanol. Add 7.46 g of formic acid and mix until solution is homogeneous.

Preparation of IPC Saline

An in-package-crosslinking packaging saline ("IPC saline") is prepared according to the procedure described in Example 19 of U.S. Pat. No. 8,480,227. The prepared IPC saline contains a partially-crosslinked and thermally-crosslinkable hydrophilic polymeric material, which is produced in an extra step, i.e., preheating a PBS saline (pH 7.2-7.4) containing 0.07 wt % of poly(Aam-co-AA) (90/10) Mw 200 KD and 0.15 wt % of PAE.

Preparation of Packaging Salines

Three packaging salines ("Saline") are prepared to have a concentration of the hydrophilic copolymer (prepared in Example 2) of 0.1 wt % (Saline A), 0.5 wt % (Saline B) and 2.0 wt % (Saline C) as follows. Weigh purified copolymer solution (6.6% solids, prepared in Example 2) into a 20 mL scintillation vial. Add amounts of the rest of the reagents into the vial, mix until complete dissolved, as showin in Table 2.

TABLE 2

| | Components (g) | | | | | |
| --- | --- | --- | --- | --- | --- | --- |
| Saline | Copolymer sol'n | $NaH_2PO_4 \cdot H_2O$ | $Na_2HPO_4 \cdot 2H_2O$ | NaCl | DI $H_2O$ | pH |
| A | 0.152 | 0.0074 | 0.0304 | 0.0799 | 9.751 | 7.20 |
| B | 0.758 | 0.0075 | 0.0301 | 0.0802 | 9.142 | 7.25 |
| C | 3.030 | 0.0072 | 0.0302 | 0.0806 | 6.881 | 7.28 |

Preparation of Lens Formulation

A lens formulation is prepared to have the following composition: 10 parts by weight of PrOH; 32 parts by weight of DMA; 1.5 parts by weight of Norbloc; 0.4 parts by weight of UV28; 28 parts by weight of TRIS-Am; 40 parts by weight of CE-PDMS; and 0.5 part by weight of Vazo-64. All components are added into a clean bottle, with a stir bar to mix at 600 rpm for 30 minutes at room temperature. After all the solid is dissolved, the formulation is filtered with a glass micro filter (2.7 μm GMF filter).

Lens Fabrication

Lenses are prepared by cast-molding from a lens formulation prepared above. The lens formulation is purged with nitrogen at room temperature for 30 to 35 minutes. The $N_2$-purged lens formulation is introduced into polypropylene molds. The molds with the lens formulation therein are placed in an oven having room temperature and the oven is $N_2$-purged for 30 minutes. The molds with the lens formulation therein are placed in an oven having room temperature. Then, the oven is $N_2$-purged for 30 minutes, and then proceeded with the thermal curing process according to a curing profile (heating from room temperature to 110° C. at a ramp rate of about 5° C./minute and coiling down directly).

Lens molds each with one molded silicone hydrogel lens precursor therein are mechanically opened. The molded silicone hydrogel precursors adhere to the male mold halves and removed (i.e., "delensed") from lens-adhered male mold halves by using liquid nitrogen.

After delensing, SiHy lenses precursor prepared above are subjected to the following post-molding steps (i.e., dipping the SiHy lens precursors in a series of different solution baths) as shown in Table 3.

TABLE 3

| Dipping Step | Bath of Solution | Dipping Time (s) |
| --- | --- | --- |
| 1 | MEK | 22 |
| 2 | MEK | 78 |
| 3 | MEK | 224 |
| 4 | DI water | 56 |
| 5 | 0.44% PAA Solution | 56 |
| 6 | 50/50 1-PrOH/DI water | 56 |
| 7 | DI water | 56 |
| 8 | DI water | 56 |
| 9 | DI water | 56 |
| 10 | DI water | 56 |
| 11 | PBS | Holding |

The SiHy contact lenses have the following roperties: Dkc~140 barrers; EWC~32 wt. %; elastic modulus~0.79 MPa.

Application of Crosslinked Hydrophilic Coating (Hydrogel Coating)

After the above post-molding steps, resultant SiHy contact lenses are placed individually in polypropylene lens packaging shells (or blisters) (one lens per shell) each containing 0.65 mL of saline A, saline B, saline C, PBS, or IPC Saline. The blisters are then sealed with foil and autoclaved for about 45 minutes at about 121° C.

Lens Testing

After autoclaving, coated SiHy contact lenses are evaluated by low pH CLAN to test for the presence of a homogeneous crosslinked lens surface coating. The negative controls (without any hydrogel coating thereon) fail this test and the positive control (with a hydrogel coating thereon) and the 3 lenses under test pass the test, indicating the presence of a crosslinked homogenous surface coating (hydrogel coating). The coated SiHy contact lenses also undergo one cycle of manual rubbing to evaluate durability of the hydrogel coating. These lenses under test still pass the Low pH CLAN testing, indicating some durability of the hydrogel coating. The finger lubricity test indicate that the lubricity of the lens surface is also good.

TABLE 4

| | Negative control | | Positive control | Under Test | | |
| --- | --- | --- | --- | --- | --- | --- |
| | #1 | #2 | | Test A | Test B | Test C |
| PAA dip | no | yes | yes | yes | yes | yes |
| Packaging saline | PBS | PBS | IPC Saline | Saline A | Saline B | Saline C |
| Characterization data | | | | | | |
| Low pH Staining Test Before rubbing | fail | fail | pass | pass | pass | pass |
| After rubbing | N/A | fail | pass | pass | pass | pass |
| Finger Lubricity | 3 | 3 | 2 | 2 | 2 | 0 |

All the publications, patents, and patent application publications, which have been cited herein above in this application, are hereby incorporated by reference in their entireties.

What is claimed is:

1. A method for making coated contact lenses, comprising the steps of:
   (1) obtaining a contact lens precursor which has a concave surface and an opposite convex surface and comprises a lens bulk material and carboxylic acid groups on and/or near the anterior and posterior surfaces;
   (2) immersing the contact lens precursor in an aqueous solution in a container, wherein the aqueous solution comprises from about 0.01% to about 5.0% by weight of at least one hydrophilic copolymer that is a statistical copolymer of formula (I)

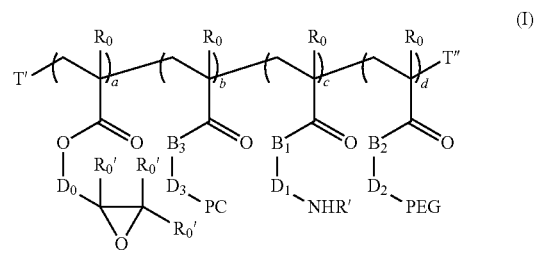

in which
T' and T" independent of each other are H or a terminal group; each $R_0$ independent one another is H or $CH_3$; each $R_0'$ independent of one another is H or $C_1$-$C_4$ alkyl; $B_1$, $B_2$ and $B_3$ independent of one another are O or NR'; R' is H or $C_1$-$C_4$ alkyl; $D_1$, $D_2$ and $D_3$ independent of one another are a $C_1$-$C_{12}$ alkylene divalent radical; $D_0$ is a $C_1$-$C_{12}$ alkylene divalent radical or a divalent radical of -$D_4$-O-$D_5$-$B_4$—$CH_2$—; $B_4$ is —O— or

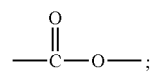

$D_4$ is a $C_1$-$C_{12}$ alkylene divalent radical; $D_5$ is a $C_2$-$C_6$ alkylene divalent radical or a divalent radical of

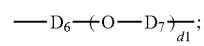

$D_6$ and $D_7$ independent of each other is a $C_2$-$C_6$ alkylene divalent radical; d1 is zero, 1 or 2; PEG is a polyethyleneglycol group of

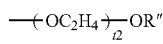

in which R" is H or $C_1$-$C_4$ alkyl; t2 is an integer from 3 to 100; PC is a zwitterionic group of

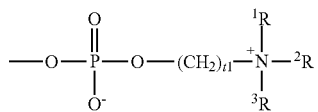

in which t1 is an integer of 1 to 5 and $^1R$, $^2R$ and $^3R$ independently of one another are $C_1$-$C_8$ alkyl or $C_1$-$C_8$ hydroxyalkyl; a, b, c, and d independent of one another are an integer of from 5 to 100, wherein $(a+c)/(a+b+c+d) \leq 0.40$ and a/c is from 2.5 to 0.4; and (3) heating the aqueous solution with the contact lens precursor therein at a temperature of from about 100° C. to about 140° C. for at least 30 minutes to form a coated contact lens having a hydrogel coating thereon, wherein the hydrogel coating is covalently attached onto the anterior and posterior surfaces through linkages each formed between one carboxylic acid group and one epoxy group, wherein the hydrogel coating comprises a crosslinked polymeric material comprising polymer chains derived from the hydrophilic copolymer, wherein the contact lens has a water-break-up time (WBUT) of at least 10 seconds.

2. The method of claim 1, wherein the contact lens precursor is composed of a lens bulk material that has carboxylic acid groups on and/or near the surfaces of the lens bulk material.

3. The method of claim 2, wherein the lens bulk material is obtained by polymerizing a polymerizable composition comprising from about 0.1% to about 10% by weight of a vinylic monomer which further comprises at least one carboxylic acid group.

4. The method of claim 2, wherein the lens bulk material has been subjected to at least one post-curing surface treatment to have the carboxylic acid groups on and/or near the surfaces of the lens bulk material.

5. The method of claim 1, wherein the contact lens precursor comprises a lens bulk material and a layer of at least one polymeric material having carboxylic acid groups thereon.

6. The method of claim 5, wherein said at least one polymeric material having the carboxylic acid groups comprises a homo- or copolymer of acrylic acid or $C_1$-$C_3$ alkylacrylic acid.

7. The method of claim 1, where the step of heating is performed by autoclaving the contact lens precursor with the carboxylic acid groups thereon immersed in the aqueous solution which is a packaging solution in a sealed lens package at a temperature of from about 115° C. to about 125° C. for approximately 30-90 minutes.

8. The method of claim 7, wherein in formula (I), $(a+c)/(a+b+c+d) \leq 0.35$.

9. The method of claim 8, wherein in formula (I), a/c is from 2 to 0.5.

10. The method of claim 8, wherein the lens bulk material is (i) a hard plastic material, (ii) a rigid gas permeable lens material, (iii) a non-silicone hydrogel material, or (iv) a silicone hydrogel material, or wherein the lens bulk material consists essentially of (a) a central optical zone that is essentially made of a rigid gas permeable lens material and surrounded by a peripheral zone that is essential made of a silicone hydrogel material or a non-silicone hydrogel material, or (b) a 3-dimensional article and a silicone hydrogel material or a non-silicone hydrogel material, wherein the 3-dimensional article is made of a non-hydrogel material and has a 3-dimensional size smaller than that of the preformed embedded contact lens so that the 3-dimensional article is completely embedded within the silicone hydrogel material or the non-silicone hydrogel material.

11. A contact lens, comprising: an anterior surface, an opposite posterior surface, and a layered structural configuration from the anterior surface to the posterior surface, wherein the layered structural configuration comprises an outer anterior surface hydrogel layer, an inner layer, and an outer posterior surface hydrogel layer, wherein the inner layer comprises a lens bulk material and has carboxylic acid groups on and/or near the surfaces of the inner layer, wherein the outer anterior surface hydrogel layer and the outer posterior surface hydrogel layer comprise a crosslinked polymeric material comprising polymer chains derived from a hydrophilic copolymer that is a statistical copolymer of formula (I)

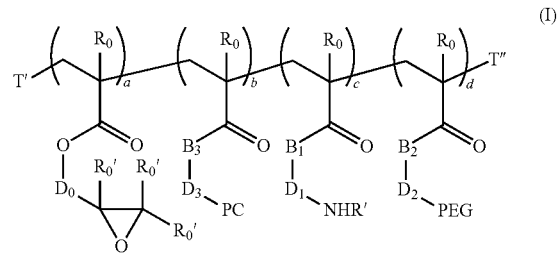

in which

T' and T" independent of each other are H or a terminal group; each $R_0$ independent one another is H or $CH_3$; each $R_0'$ independent of one another is H or $C_1$-$C_4$ alkyl; $B_1$, $B_2$ and $B_3$ independent of one another are O or NR'; R' is H or $C_1$-$C_4$ alkyl; $D_1$, $D_2$ and $D_3$ independent of one another are a $C_1$-$C_{12}$ alkylene divalent radical; $D_0$ is a $C_1$-$C_{12}$ alkylene divalent radical or a divalent radical of -$D_4$-O-$D_5$-$B_4$—$CH_2$—; $B_4$ is —O— or

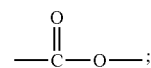

$D_4$ is a $C_1$-$C_{12}$ alkylene divalent radical; $D_5$ is a $C_2$-$C_6$ alkylene divalent radical or a divalent radical of

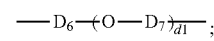

$D_6$ and $D_7$ independent of each other is a $C_2$-$C_6$ alkylene divalent radical; d1 is zero, 1 or 2; PEG is a polyethyleneglycol group of

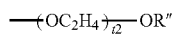

in which R" is H or $C_1$-$C_4$ alkyl; t2 is an integer from 3 to 100; PC is a zwitterionic group of

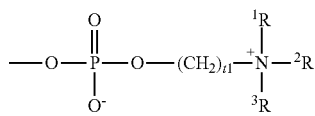

in which t1 is an integer of 1 to 5 and $^1R$, $^2R$ and $^3R$ independently of one another are $C_1$-$C_8$ alkyl or $C_1$-$C_8$ hydroxyalkyl; a, b, c, and d independent of one another are an integer of from 5 to 100, wherein (a+c)/(a+b+c+d)≤0.40 and a/c is from 2.5 to 0.4, and wherein the outer anterior surface hydrogel layer and the outer posterior surface hydrogel layer are covalently attached onto the inner layer through linkages each formed between one carboxylic acid group and one epoxy group, wherein the contact lens has a water-break-up time (WBUT) of at least 10 seconds.

12. The contact lens of claim 11, wherein the inner layer is composed of a lens bulk material that has carboxylic acid groups on and/or near the surfaces of the bulk material.

13. The contact lens of claim 11, wherein the inner layer comprises a lens bulk material and a layer of at least one polymeric material having carboxylic acid groups, wherein said at least one polymeric material having the carboxylic acid groups comprises a homo- or copolymer of acrylic acid or $C_1$-$C_3$ alkylacrylic acid.

14. The contact lens of claim 11, wherein in formula (I), (a+c)/(a+b+c+d)≤0.35.

15. The contact lens of claim 11, wherein in formula (I), a/c is from 2 to 0.5.

16. The contact lens of claim 11, wherein the lens bulk material is (i) a hard plastic material, (ii) a rigid gas permeable lens material, (iii) a non-silicone hydrogel material, or (iv) a silicone hydrogel material, or wherein the lens bulk material consists essentially of (a) a central optical zone that is essentially made of a rigid gas permeable lens material and surrounded by a peripheral zone that is essential made of a silicone hydrogel material or a non-silicone hydrogel material, or (b) a 3-dimensional article and a silicone hydrogel material or a non-silicone hydrogel material, wherein the 3-dimensional article is made of a non-hydrogel material and has a 3-dimensional size smaller than that of the preformed embedded contact lens so that the 3-dimensional article is completely embedded within the silicone hydrogel material or the non-silicone hydrogel material.

17. The contact lens of claim 12, wherein the lens bulk material is (i) a hard plastic material, (ii) a rigid gas permeable lens material, (iii) a non-silicone hydrogel material, or (iv) a silicone hydrogel material, or wherein the lens bulk material consists essentially of (a) a central optical zone that is essentially made of a rigid gas permeable lens material and surrounded by a peripheral zone that is essential made of a silicone hydrogel material or a non-silicone hydrogel material, or (b) a 3-dimensional article and a silicone hydrogel material or a non-silicone hydrogel material, wherein the 3-dimensional article is made of a non-hydrogel material and has a 3-dimensional size smaller than that of the preformed embedded contact lens so that the 3-dimensional article is completely embedded within the silicone hydrogel material or the non-silicone hydrogel material.

18. The contact lens of claim 13, wherein the lens bulk material is (i) a hard plastic material, (ii) a rigid gas permeable lens material, (iii) a non-silicone hydrogel material, or (iv) a silicone hydrogel material, or wherein the lens bulk material consists essentially of (a) a central optical zone that is essentially made of a rigid gas permeable lens material and surrounded by a peripheral zone that is essential made of a silicone hydrogel material or a non-silicone hydrogel material, or (b) a 3-dimensional article and a silicone hydrogel material or a non-silicone hydrogel material, wherein the 3-dimensional article is made of a non-hydrogel material and has a 3-dimensional size smaller than that of the preformed embedded contact lens so that the 3-dimensional article is completely embedded within the silicone hydrogel material or the non-silicone hydrogel material.

19. The contact lens of claim 14, wherein the lens bulk material is (i) a hard plastic material, (ii) a rigid gas permeable lens material, (iii) a non-silicone hydrogel material, or (iv) a silicone hydrogel material, or wherein the lens bulk material consists essentially of (a) a central optical zone that is essentially made of a rigid gas permeable lens material and surrounded by a peripheral zone that is essential made of a silicone hydrogel material or a non-silicone hydrogel material, or (b) a 3-dimensional article and a silicone hydrogel material or a non-silicone hydrogel material, wherein the 3-dimensional article is made of a non-hydrogel material and has a 3-dimensional size smaller than that of the preformed embedded contact lens so that the 3-dimensional article is completely embedded within the silicone hydrogel material or the non-silicone hydrogel material.

20. The contact lens of claim 15, wherein the lens bulk material is (i) a hard plastic material, (ii) a rigid gas permeable lens material, (iii) a non-silicone hydrogel material, or (iv) a silicone hydrogel material, or wherein the lens bulk material consists essentially of (a) a central optical zone that is essentially made of a rigid gas permeable lens material and surrounded by a peripheral zone that is essential made of a silicone hydrogel material or a non-silicone hydrogel material, or (b) a 3-dimensional article and a silicone hydrogel material or a non-silicone hydrogel material, wherein the 3-dimensional article is made of a non-hydrogel material and has a 3-dimensional size smaller than that of the preformed embedded contact lens so that the 3-dimensional article is completely embedded within the silicone hydrogel material or the non-silicone hydrogel material.

* * * * *